(12) United States Patent
Wang et al.

(10) Patent No.: US 12,052,317 B2
(45) Date of Patent: *Jul. 30, 2024

(54) SUBSCRIPTION AND NOTIFICATION SERVICE

(71) Applicant: Convida Wireless, LLC, Wilmington, DE (US)

(72) Inventors: Chonggang Wang, Princeton, NJ (US); Gregory S. Sternberg, Mount Laurel, NJ (US); Shamim Akbar Rahman, Cote St. Luc (CA); Xu Li, Plainsboro, NJ (US); Quang Ly, North Wales, PA (US); Catalina Mihaela Mladin, Hatboro, PA (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,218

(22) Filed: Jul. 17, 2023

(65) Prior Publication Data

US 2023/0362253 A1 Nov. 9, 2023

Related U.S. Application Data

(63) Continuation of application No. 18/149,311, filed on Jan. 3, 2023, now Pat. No. 11,750,702, which is a
(Continued)

(51) Int. Cl.
*H04L 67/12* (2022.01)
*G06Q 10/06* (2023.01)
(Continued)

(52) U.S. Cl.
CPC .......... *H04L 67/12* (2013.01); *G06Q 10/06* (2013.01); *G06Q 10/10* (2013.01); *H04L 67/55* (2022.05);
(Continued)

(58) Field of Classification Search
CPC ........ H04W 76/12; H04W 4/70; H04L 67/55; H04L 67/12; H04L 43/00; H04L 67/288;
(Continued)

(56) References Cited

U.S. PATENT DOCUMENTS

2006/0149788 A1* 7/2006 Bosloy .................. H04L 43/00
2015/0312332 A1 10/2015 Foti
(Continued)

FOREIGN PATENT DOCUMENTS

CN 103618800 A 3/2014
CN 105210344 A 12/2015
(Continued)

OTHER PUBLICATIONS

ETSI TS 118101 V1.1.0, Technical Specification, "oneM2M; Functional Architecture (oneM2M TS-0001 version 1.13.1 Release 1)", Mar. 2016, 319 pages.
(Continued)

*Primary Examiner* — Kyung H Shin
(74) *Attorney, Agent, or Firm* — BakerHostetler

(57) ABSTRACT

Mechanisms for subscription and notification may include dynamically changing notification behavior based on notification target status or support access to notification history information.

20 Claims, 18 Drawing Sheets

Related U.S. Application Data continuation of application No. 17/474,284, filed on Sep. 14, 2021, now Pat. No. 11,582,306, which is a continuation of application No. 17/007,402, filed on Aug. 31, 2020, now Pat. No. 11,153,398, which is a continuation of application No. 16/317,220, filed as application No. PCT/US2017/042126 on Jul. 14, 2017, now Pat. No. 10,798,198.

(60) Provisional application No. 62/362,266, filed on Jul. 14, 2016.

(51) Int. Cl.

| | | |
|---|---|---|
| *G06Q 10/10* | (2023.01) | |
| *H04L 67/55* | (2022.01) | |
| *H04L 67/63* | (2022.01) | |
| *H04W 4/70* | (2018.01) | |
| *H04W 76/12* | (2018.01) | |
| *H04L 43/00* | (2022.01) | |
| *H04L 67/125* | (2022.01) | |
| *H04L 67/288* | (2022.01) | |

(52) U.S. Cl.
CPC ............... *H04L 67/63* (2022.05); *H04W 4/70* (2018.02); *H04W 76/12* (2018.02); *H04L 43/00* (2013.01); *H04L 67/125* (2013.01); *H04L 67/288* (2013.01)

(58) Field of Classification Search
CPC ....... H04L 67/125; H04L 67/63; G06Q 10/06; G06Q 10/10
See application file for complete search history.

(56) References Cited

U.S. PATENT DOCUMENTS

| | | | |
|---|---|---|---|
| 2016/0088420 A1 | 3/2016 | Kim et al. | |
| 2016/0192111 A1* | 6/2016 | Choi | ..................... H04W 76/12 455/507 |

FOREIGN PATENT DOCUMENTS

| | | |
|---|---|---|
| CN | 105493524 A | 4/2016 |
| CN | 105578381 A | 5/2016 |
| CN | 105580327 A | 5/2016 |
| KR | 10-2016-0039612 A | 4/2016 |
| WO | 2015/046960 A1 | 4/2015 |
| WO | 2016/004301 A1 | 1/2016 |

OTHER PUBLICATIONS

OneM2M-TS-0001, "oneM2M Functional Architectural", V-2.6.0, 2016, 425 pages.

* cited by examiner

SUBSCRIPTION AND NOTIFICATION SERVICE

CROSS-REFERENCE TO RELATED APPLICATIONS

This application is a continuation of U.S. patent application Ser. No. 18/149,311 filed Jan. 3, 2023 which is a continuation of U.S. patent application Ser. No. 17/474,284 filed Sep. 14, 2021 which is a continuation of U.S. patent application Ser. No. 17/007,402 filed Aug. 31, 2020 which is a continuation of U.S. patent application Ser. No. 16/317,220 filed Jan. 11, 2019 which is a National Stage Application filed under 35 U.S.C. 371 of International Application No. PCT/US2017/042126 filed Jul. 14, 2017, which claims the benefit of priority of U.S. Provisional Patent Application No. 62/362,266, filed on Jul. 14, 2016, the contents of the applications are hereby incorporated by reference herein.

BACKGROUND

From a protocol stack perspective, service layers are typically situated above the application protocol layer and provide value added services to applications. Hence service layers are often categorized as 'middleware' services. For example, FIG. 1 shows an exemplary service layer between an IP network stack and applications.

An M2M service layer is an example of one type of service layer specifically targeted towards providing value-added services for M2M type devices and applications. Recently, several industry standards bodies (e.g., oneM2M Functional Architecture) have been developing M2M service layers to address the challenges associated with the integration of M2M types of devices and applications into deployments such as the Internet/Web, cellular, enterprise, and home network.

An M2M service layer may provide applications and devices access to a collection of M2M-oriented capabilities supported by the service layer. A few examples include security, charging, data management, device management, discovery, provisioning, and connectivity management. These capabilities are made available to applications via Application Programming Interfaces (APIs) which make use of message formats, resource structures, resource representations, and function calls as defined by the M2M service layer. For example, an M2M service layer may maintain massive M2M data, which can be retrieved or subscribed by M2M applications based on their access rights. Subscription-based data access may be more efficient than retrieval-based data access since it does not introduce any message to M2M application until desired changes to the subscribed resource take place. The cost however, is that M2M application needs to make subscriptions first before they can receive automatic notifications from the M2M service layer.

oneM2M is a standard that provides technical specifications which address the need for a common M2M Service Layer that can be readily embedded within various hardware and software, and which can be relied upon to connect a wide variety of devices in the field with M2M application servers worldwide.

The oneM2M common services layer supports a set of Common Service Functions (CSFs) (e.g., service capabilities), as shown in FIG. 2. An instantiation of a set of one or more particular types of CSFs is referred to as a Common Services Entity (CSE) which can be hosted on different types of network nodes (e.g. infrastructure node (IN), middle node (MN), application-service node (ASN)). The CSFs provide a set of services to application entities (AEs) or other CSEs.

oneM2M develops a Resource Oriented Architecture (ROA) shown in FIG. 3. In ROA architecture, a resource is a uniquely addressable element in the architecture having a representation that can be manipulated via RESTful methods such as Create, Retrieve, Update, and Delete. These resources are made addressable using Uniform Resource Identifiers (URIs). A resource may contain child resource(s) and attribute(s). A child resource is a resource that has a containment relationship with a parent resource. The parent resource representation contains references to its child resources(s). The lifetime of a child-resource is limited by the parent's resource lifetime. Each resource supports a set of "attributes" that store information of the resource.

A CSE may register to another CSE. For example, an M2M gateway (e.g., MN-CSE) registers itself to an M2M server (e.g., IN-CSE) and the M2M server becomes the registrar CSE of the M2M gateway. Likewise, when an IN-AE registers to an IN-CSE, the IN-CSE is referred to as the registrar CSE of the IN-AE.

The oneM2M functional architecture defines a set of CSFs which may be provided by a CSE such as an M2M server oneM2M Functional Architecture to other CSEs or AEs. One of the defined CSFs is Subscription and Notification (SUB) which provides notifications pertaining to a subscription that tracks changes on a resource (e.g. deletion of a resource).

The SUB CSF manages subscriptions to resources, subject to Access Control Policies (ACPs), and sends corresponding notifications to the address(es) where the resource subscribers want to receive them. An AE or a CSE is the subscription resource subscriber. AEs and CSEs subscribe to resources of other CSEs. A subscription Hosting CSE sends notifications to the address (es) (or notification targets) specified by the resource subscriber when modifications to a resource are made. The scope of a resource subscription includes tracking changes and operations of attribute(s) and direct child resource(s) of the subscribed-to resource. It does not include tracking the change of attribute(s) of the child resource(s). Each subscription may include notification criteria that specify which, when, and how notifications are sent. These notification criteria may work in conjunction with oneM2M's Communication Management and Delivery Handling (CMDH) policies. A subscription is represented as resource <subscription> in the CSE resource structure.

In summary, the functions supported by the SUB CSF are as follows oneM2M Functional Architecture: 1) inclusion of IDs; 2) ability to subscribe to a resource; 3) subscriber requests to send notifications; 4) request to cache missed notifications; 5) request rate limit for receiving notifications; or 5) notification target being removed from CSE.

In more detail, inclusion of the resource subscriber ID, the hosting CSE-ID and subscribed-to resource address(es) may be done per resource subscription request. It may also include other criteria (e.g. resource modifications of interest and notification policy) and the address(es) where to send the notifications.

There is the ability to subscribe to a single resource via a single subscription, or subscribe to multiple resources via a single subscription when they are grouped and represented as a single group resource. When a subscriber makes subscription to a group of resources, the same event notification criteria are used for all resources in the group; in turn, the hosting CSE may generate notification whenever changes to an individual (not all) resource take place.

The subscriber can request the hosting CSE to send out notification messages in a batch instead of one at a time. The subscriber can indicate how many notification messages should be batched together.

The subscriber can request the hosting CSE to cache missed notifications due to a period of unavailable connectivity (e.g. to the subscriber). After the connectivity becomes available, the hosting CSE can send the latest pending notification or all pending notifications to the subscriber. The subscriber can indicate the rate limit at which it receives notifications. And, a notification target can request the hosting CSE to remove it from the list of targets for receiving notifications.

In oneM2M, subscribers could be AE(s) or CSE(s), while hosting node(s) have to be CSE(s). For example, an IN-AE as a subscriber may make subscription to resources hosted by an IN-CSE (i.e. hosting node). FIG. 4 illustrates an example procedure according to oneM2M specification, where IN-AE1 makes a subscription to a resource on an IN-CSE (e.g., <subscribed-to-resource>). To do that, the IN-AE1 issues a CREATE request to create a <subscription> resource under <subscribed-to-resource> (i.e. step A); the IN-AE1 can indicate eventNotificationCriteria and multiple notificationURIs in this step. The eventNotificationCriteria shows which events about <subscribed-to-resource> the IN-AE1 is interested. The notification may be sent to the Subscriber (e.g., IN-AE1) or notification target as indicated by notificationURI (i.e. notificationURI1 for the subscriber and notificationURI2 for another notification target in this example). The IN-CSE as hosting CSE will first create a <subscription> as sub-resource of <subscribed-to-resource> after receiving the subscription request from step A. After that, when an event occurs and meets eventNotificationCriteria as contained in step A, the IN-CSE will automatically send two notifications, respectively to the subscriber and notification target (i.e., step E and step F). Note that the subscription request in step A could contain multiple notificationURIs, which means the subscriber is requesting future notifications to be sent to multiple notification targets. In such a case, the eventNotificationCriteria is the same and applies to all notificationURIs. Although not shown in the figure, oneM2M supports that the hosting CSE performs batch notifications when batchNotify attribute is used, where the hosting CSE can send multiple notifications to the same notificationURI in one message.

SUMMARY

In M2M/IoT domain, resource subscription provides a mechanism to receive automatic notifications when changes occur on subscribed resources. Conventional M2M service layer (e.g., oneM2M) supports sending subscription notifications to a list of nodes (e.g., notification targets). The subscribing entity may or may not be included as a notification target. Conventional M2M service layer does not include access to information about past notifications, which may be problematic when a subscriber is not among the notification targets. Another problem may be that the service layer is also not aware of situational information about notification targets. Based on the aforementioned problems there may be inefficiencies, such as sending unnecessary notifications to unavailable or overloaded notification targets.

Disclosed herein are methods and systems for subscription and notification services. For example, the disclosed subject matter may allow for dynamic change of notification behavior based on notification target status to reduce the number of missed or unnecessary notifications or support access to notification history information in different granularities, among other things.

In a first exemplary method, the service layer records issue notifications by creating new notification resources actively or in response to a request of the subscriber. The subscriber and notification targets may access the created notification resources to obtain information about past notifications. The subscriber also has the freedom to stop or change notification recording. In a second exemplary method, the service layer maintains the statistical information of issued notifications. The subscriber may access such notification statistical information. Based on this information, the subscriber may request the service layer to remove existing notification targets or add new notification targets. In a third exemplary method, the service layer sends a notification confirmation message to the subscriber under certain conditions, for example, after a notification is issued and transmitted to a notification target.

In a fourth exemplary method, the subscriber directly interacts with notification targets to request them to calculate notification statistical information or send notification confirmation back to the subscriber. In a fifth exemplary method, the service layer may contact notification targets before a subscription request is fully executed to make notification targets aware of the subscriber and corresponding subscription. Also, notification targets may actively or passively report their situational status information to the service layer so that the service layer knows their latest status and can determine the an efficient way to transmit future notifications.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Disclosed herein are mechanisms for subscription and notification, which may include dynamically changing notification behavior based on notification target status in order to reduce the number of missed or unnecessary notifications or support access to notification history information in different granularities, among other things. The disclosed subscription and notification service may have an effect on a subscriber, service layer, or notification targets. As discussed herein, resource subscription and notification mechanisms in conventional M2M service layer (e.g. oneM2M) have problems, such as the following: 1) there is no or an ineffective way for the subscriber or notification targets to access information about notifications generated in the past; or 2) notification targets are not aware of subscriptions and the service layer is unaware of the situational information of notification targets. The problems may cause unnecessary notifications and make resource subscription and notification mechanisms inefficient. In an example, a notification may be a message generated by M2M service layer when there is a change to the subscribed resource which meets event notification criteria; the notification message is sent to a subscriber or a notification target to inform them of the change.

Figure 1:
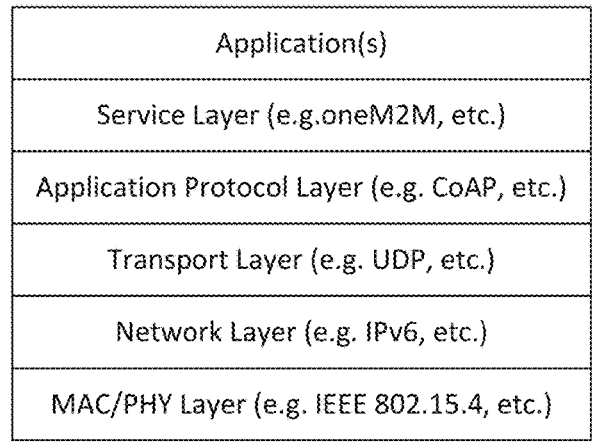
FIG. 1 illustrates an exemplary IP network stack with a service layer.
Figure 2:
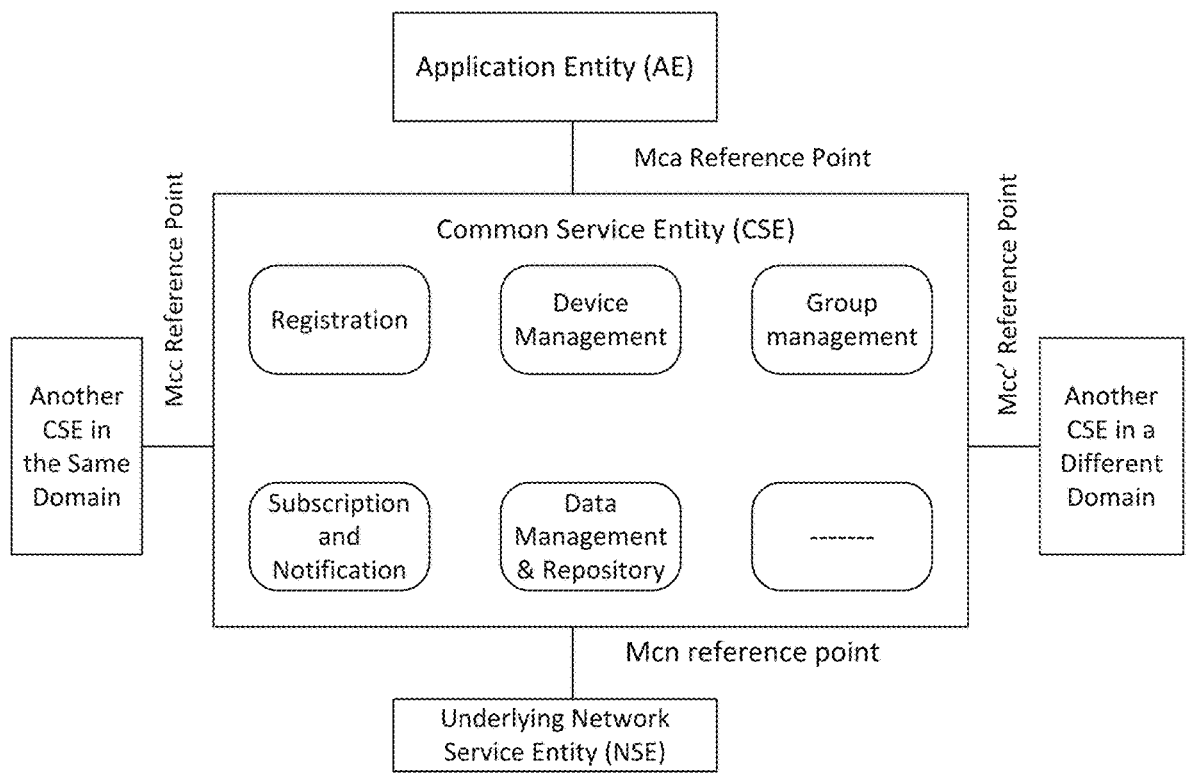
FIG. 2: illustrates an exemplary Common Service Entity (CSE) and Common Service Functions (CSF)
Figure 3:
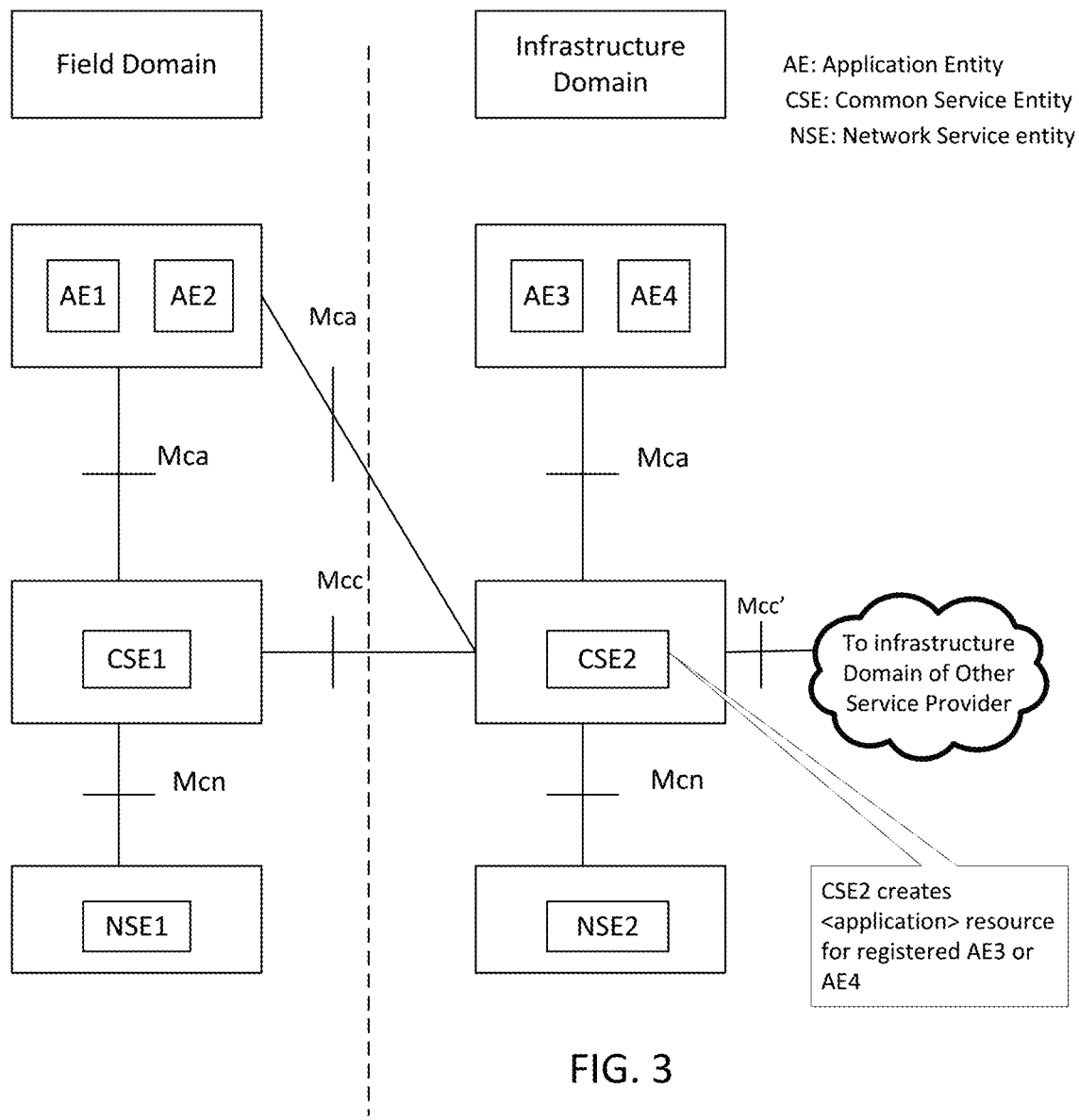
FIG. 3 illustrates an exemplary oneM2M Service Layer Functional Architecture (ROA)
Figure 4:
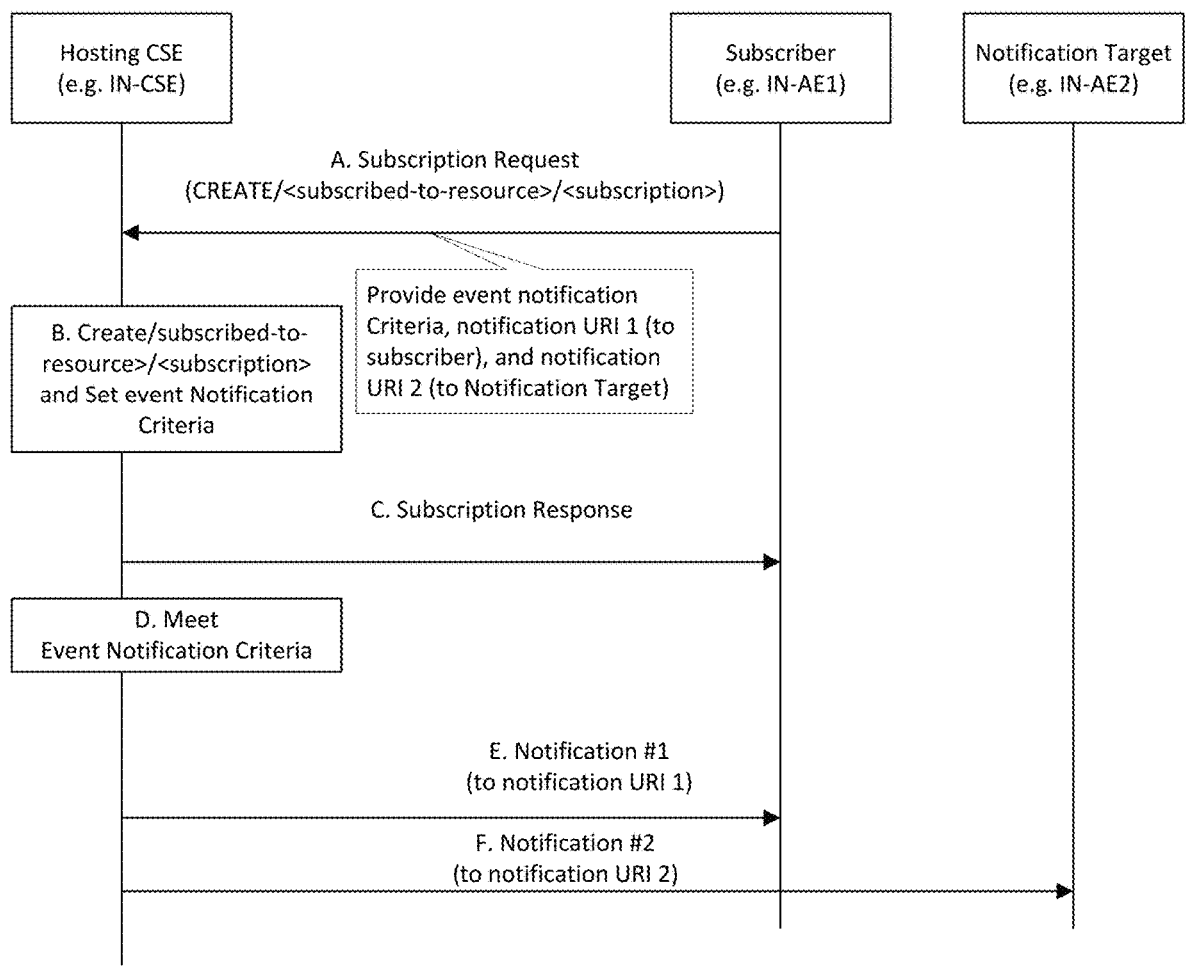
FIG. 4 illustrates an exemplary method according to oneM2M specification, where IN-AE1 makes a subscription to a resource on an IN-CSE.
Figure 5:
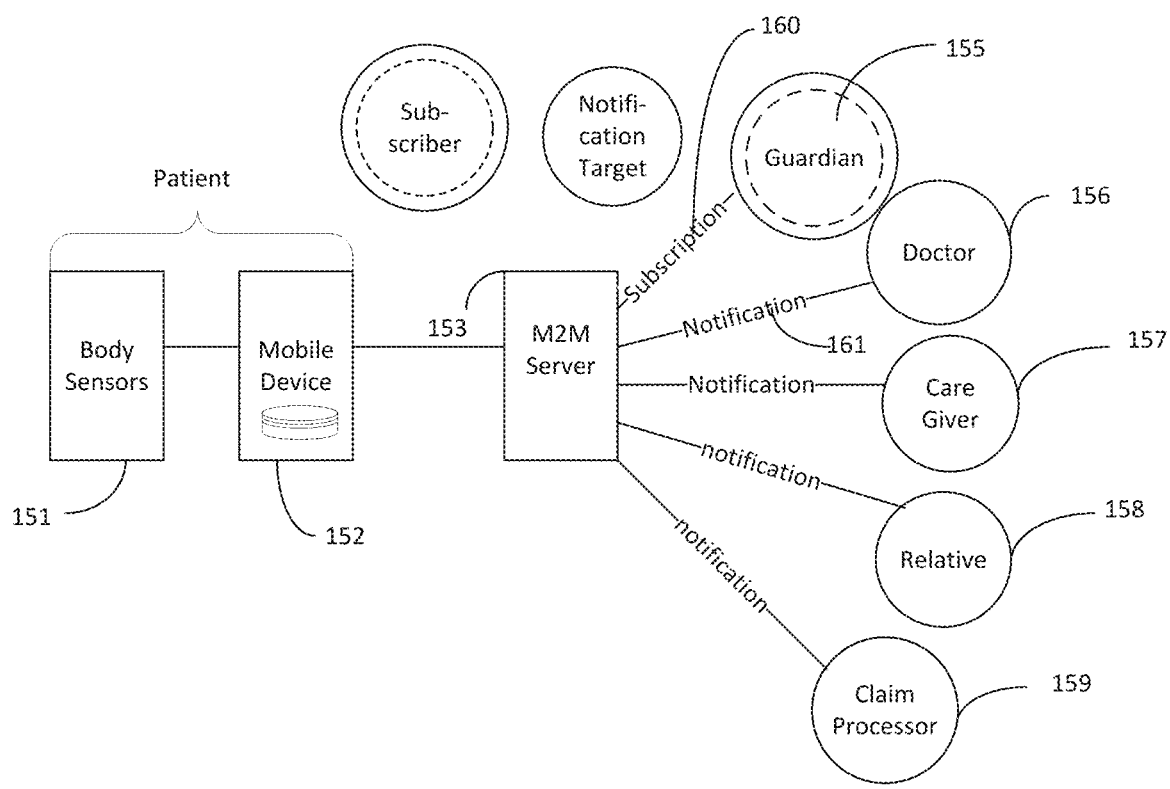
FIG. 5 illustrates an exemplary system for a smart healthcare use case.

FIG. 5 illustrates a smart healthcare scenario where health data from body sensor 151 of a patient is collected. The health data may be uploaded to M2M server 153 (or alternatively stored locally on mobile device 152 that is associated with the patient), which may be referred to as a hosting node. Via device 155, a guardian of the patient may make subscription 160 to health data so that associated devices of doctor, caregiver, relative, and insurance company of the patient (respectively devices 156, 157, 158, and 159), or the like, as notification targets, receive automatic notifications 161 about changes in the patient's health data. For example, if the patient is currently in treatment at home, a sudden increase of the patient's heartrate may be critical for the doctor to know.

In this smart healthcare scenario, there may be the following requirements on the resource subscription and notifications: 1) Req1: verify a notification is issued by M2M server 153 and received by notification target (e.g., devices 156-159) whenever an event of interest occurs (this requirement may be requested by the guardian—device 155); 2) Req2: the amount of notifications sent to and successfully received by each notification target (this requirement may be requested by the guardian—device 155); 3) Req3: do not have device 156 (e.g., doctor device) miss any notifications when the notification target has no connection to Internet or M2M server 153; 4) Req4: receive notifications about patients (or even some selected patients), no other unknown patients or individuals (e.g., may only apply to doctor device); and 5) Req5: each transmitted notification is expected to be received by notification target (this may be requested via M2M server 153). Req5 may be desired because if each notification is not received, it may waste bandwidth, contribute to overhead, and significantly affect the notifications usefulness.

oneM2M as a service layer technique has limited capabilities in supporting requirements like the aforementioned five requirements in the healthcare scenario. For example, in conventional oneM2M, a subscriber, such as an AE, does not know whether a notification is issued and successfully received by a notification target. In addition, notification targets in conventional oneM2M passively receive notifications from the service layer (e.g., response messages), no matter which subscriber the subscription is from.

Subscription or notification mechanisms in conventional M2M service layer, such as oneM2M, may have the following problems. A first problem may be that although M2M service layer (e.g., M2M server 153) may automatically generate notifications, it does not provide a subscriber (e.g., device 155) or a notification target (e.g., device 156) any access to information about notifications issued in the past. Not being able to access pat notifications may be a problem since the subscriber (e.g., device 155) may want to know if an urgent notification is indeed issued and received by all or selected notification targets; also, an offline notification target (e.g., device 156) may want to know and obtain any missing notifications after it becomes online. For example, in the smart healthcare scenario, device 155 would like to know if the notification about the sudden heartrate increase of the patient has been successfully received by device 156. This first problem relates to the aforementioned requirements of Req1-Req3.

A second problem may be that the M2M service layer is unaware of situational information about notification targets (e.g. their availability, their new IP address, etc.). Such unawareness may cause unnecessary notifications from M2M service layer to an overloaded notification target, for example. This second problem relates to the aforementioned requirements of Req3-Req5.

It is understood that the entities performing the steps illustrated herein, such as FIG. 6-FIG. 14, may be logical entities. The steps may be stored in a memory of, and executing on a processor of, a device, server, or computer system such as those illustrated in FIG. 20C or FIG. 20D. In an example, with further detail below with regard to the interaction of M2M devices, subscriber 173 or notification target 175 of FIG. 6-FIG. 14 may reside on M2M terminal device 18 of FIG. 20A, while service layer 171 of FIG. 6-FIG. 14 may reside on M2M gateway device 14 of FIG. 20A.

Figure 6:
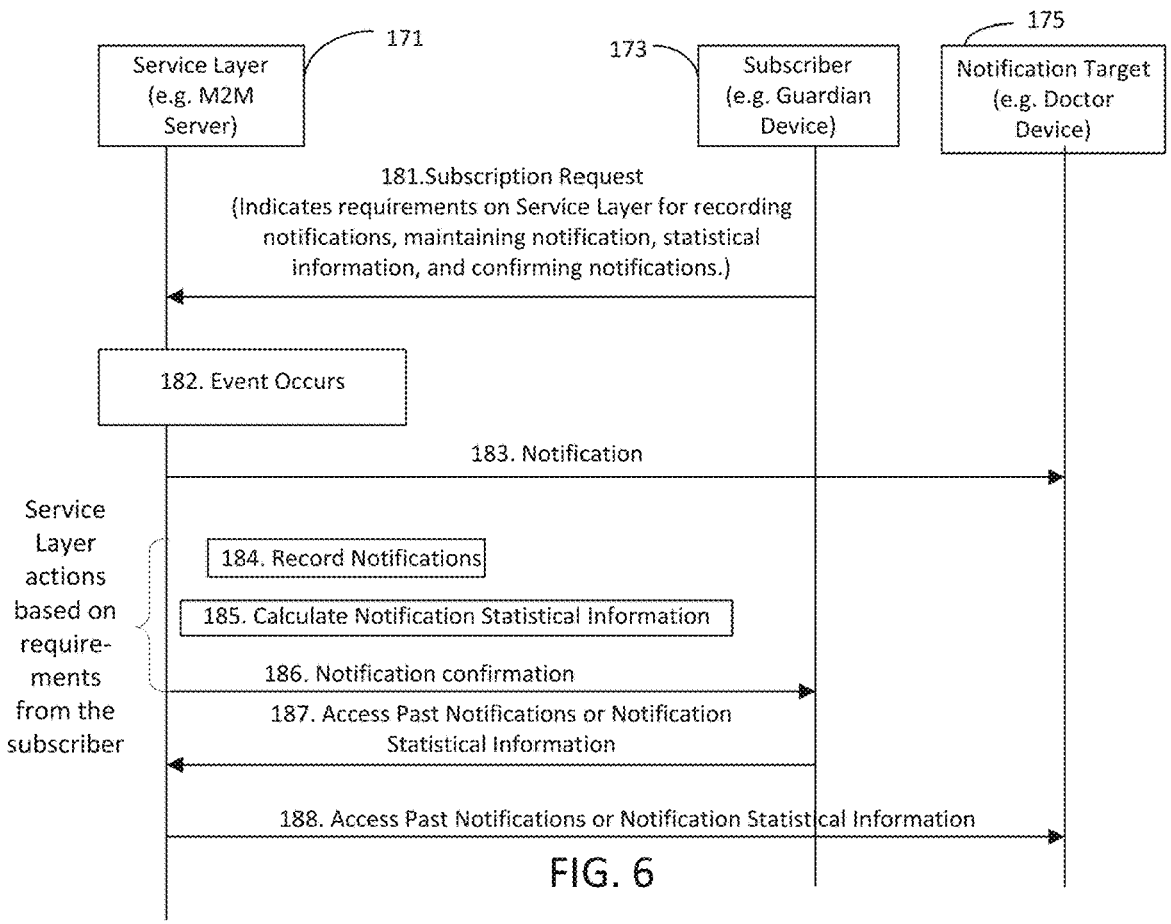
FIG. 6 illustrates a summary of exemplary methods discussed herein, such as where the subscriber first indicates its requirements for the service layer to record notifications, calculate notification statistical information, and confirm notifications during subscription request.

Discussed below are different approaches for the subscriber and notification targets to access information about past notifications, as well as a method to support notification target state awareness. FIG. 6 illustrates a summary of exemplary methods associated with the first problem. At step 181, service layer 171 (e.g., M2M server 153) may receive a subscription request from subscriber 173 (e.g., guardian—device 155). Subscription request 181 may indicate requirements on service layer 171 for recording notifications, maintaining notification statistical information, and confirming notifications with regard to notification target 175 (e.g., doctor—device 156). At step 182, service layer 171 receives an indication of an event. At step 183, which may be in response to step 182, service layer 171 sends a notification to notification target 175. Step 184 through step 185, which are discussed in more detail herein, involve service layer actions based on requirements from subscriber 173 that were sent in step 181. At step 184, there is a recording of notifications. At step 185, there is calculation of statistical information associated with notifications. At step 186, there is a confirmation of notification sent to subscriber 173. At step 187 or step 188, there is accessing of past notifications or notification statistical information from subscriber 173 or notification target 175, respectively.

With continued reference to FIG. 6, in summary, methods discussed herein may include where subscriber 173 first indicates its requirements for the service layer to record notifications, calculate notification statistical information, and confirm notifications during subscription request. Service layer 171 may conduct actions (e.g., record notifications) when an event occurs and a notification message is issued. If service layer 171 records notification or maintains notification statistical information, subscriber 173 or notification target 175 can actively access them.

Figure 7:
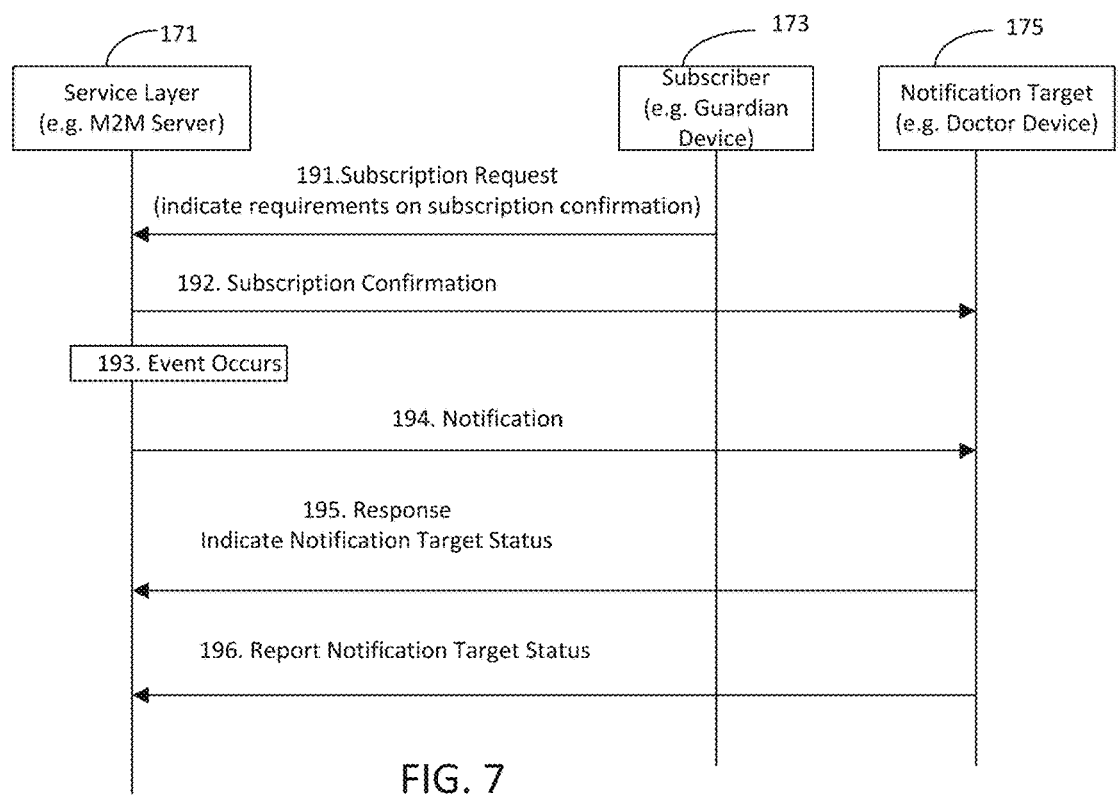
FIG. 7 illustrates an exemplary summary of a method for subscription and notification services.

In a fifth method, subscriber 171 directly requests notification targets 175 to calculate notification statistical information or send notification confirmation when it receives one or multiple notification messages from service layer 171. FIG. 7 illustrates an exemplary summary for the method flow. Subscriber 173 first indicates its requirements on subscription confirmation, based on which service layer 171 will contact notification targets 175 for confirming the subscription request from subscriber (step 191); this makes notification targets 175 aware of the subscription (step 192). At step 192, service layer 171 receives an indication of an event. At step 193, which may be in response to step 182, service layer 171 sends a notification to notification target 175. Then notification targets 175 may report their status or situational information to service layer 171 which may be contained in the response message (step 195) or in a separate message (step 196); this (step 195 or step 196) enables service layer 171 to be aware of the state of notification targets 175.

With reference to the method associated with step 184 of FIG. 6, although hosting CSE in oneM2M may cache missed notifications, the hosting CSE does not expose them to subscriber 173 or notification targets 175, so subscriber 173 or notification targets 175 are not aware that a notification has been missed. In other words, subscriber 173 or notification targets 175 may not actively retrieve or delete missed notifications from the hosting CSE in conventional oneM2M systems.

With reference to the method associated with step 185 of FIG. 6, oneM2M does not support calculating and exposing notification statistical information to subscriber 173 or notification targets 175. With reference to the method associated with step 186 of FIG. 6, oneM2M does not support sending notification confirmation to subscriber 173. Conventional oneM2M does not support direct interactions between subscriber 173 or notification targets 175. Also, with reference to FIG. 7, conventional oneM2M does not support the awareness between subscriber 173 or notification targets 175.

Discussed below are methods for access to information associated with a notification. Subscriber 173 or notification targets 175 may want to access information about previous notifications for various purposes. The methods herein may work independently or together for services associated with subscription and notification.

Figure 8:
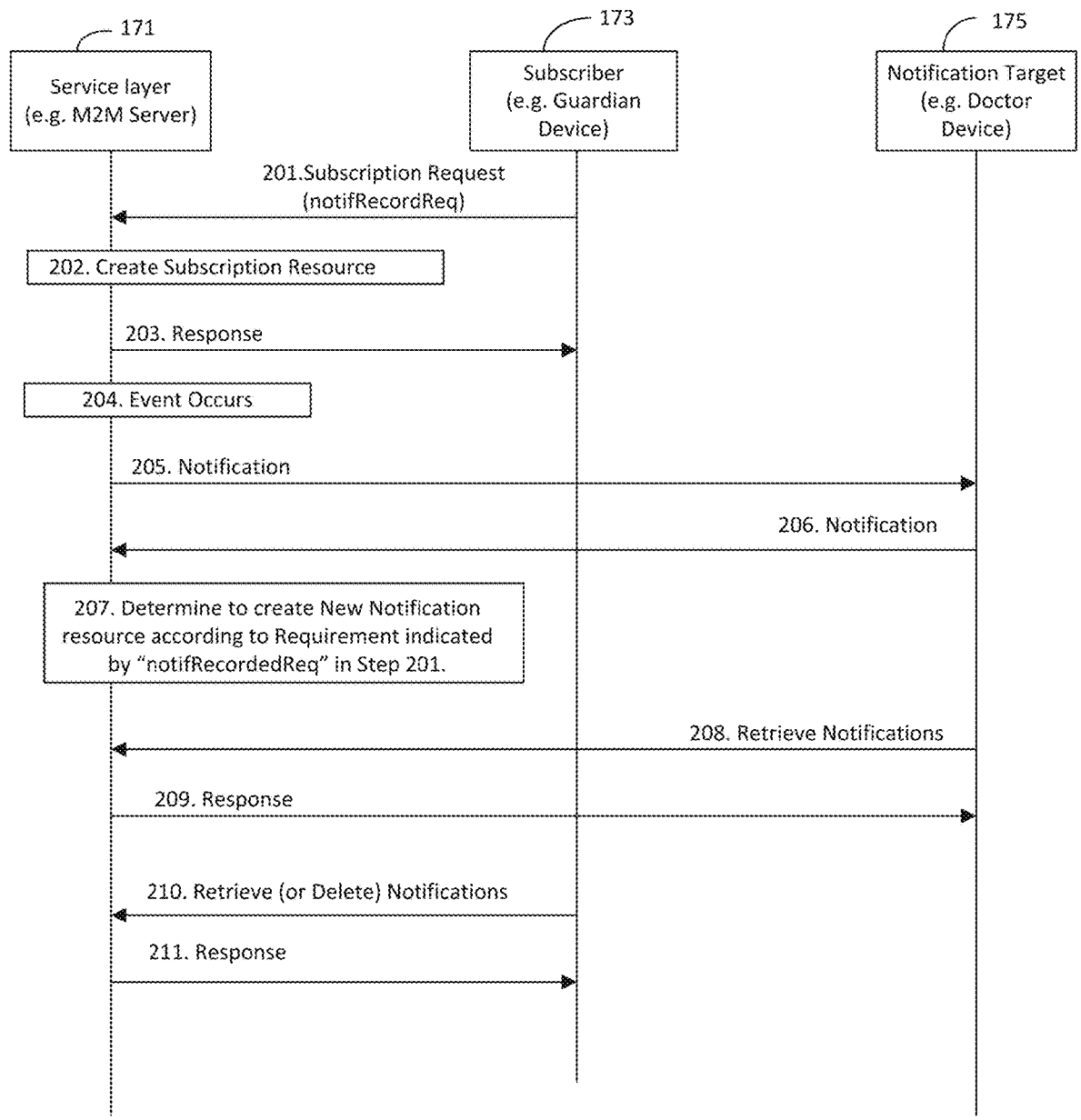
FIG. 8 illustrates an exemplary method for recording and accessing information about past notifications.

FIG. 8 illustrates an exemplary method for recording and accessing information about past notifications. In summary, for this approach service layer 171 may actively record each issued notification for later retrieval by subscriber 173 and notification target 175. Alternatively, subscriber 173 may request service layer 171 to record selected notifications (e.g. to record all notification to a specific notification target 175, to record a list of notification targets which have successfully received a notification message). It may generally work in the following way. First, subscriber 173 indicates its requirements on recording notifications in subscription request. Subsequently, whenever a notification is issued by service layer 171, service layer 171 determines whether it needs to be recorded according to the requirements from subscriber 173. If the answer is YES, service layer 171 creates a new resource for recording this notification. This new resource may be referred to as notification resource. A notification resource has a few attributes about the issued notification (e.g. its generation time, its generation condition, a reference to corresponding subscription, a list of notification targets which have successfully received this notification, etc.). Last, subscriber 173 or notification target 175 may access such notification resources created by and maintained at service layer 171. Service layer 171 may employ certain access control policies to authorize, whether subscriber 173, notification targets 175, or other service layer entities have access to these notification resources. For subscriber 173, access to the notification resources may allow it to know how many notifications have been issued and successfully received by notification targets 175. For notification target 175, the feature provided by service layer 171 gives notification target 175 the opportunity to later retrieve notifications missed when notification target 175 was offline or unavailable (e.g. notification target 175 becomes unreachable due to its address change or losing connection to service layer 171). In addition, after retrieving and knowing information about past notifications, subscriber 173 may send a request to service layer 171 to remove notification target 175, if it does not receive a notification in a time period, so that service layer 171 will not send it more notifications in the future, which may avoid or reduce unnecessary notifications. Furthermore, subscriber 173 may send a request message to service layer 171 to stop recording notifications or change how notifications should be recorded.

With continued reference to FIG. 8, below is an exemplary step-by-step discussion for recording and accessing information about past notifications. At step 201, subscriber 171 may send a subscription request message to service layer 171. In addition to information like event notification criteria, this message may contain a complex parameter "notifRecordReq," which consists of several other parameters or fields. A complex parameter includes multiple fields—each field is a parameter, as defined and shown in Table 1. This parameter may tell the service layer 171 when, how, or which issued notifications should be recorded. Table 1 defines "notifRecordReq." Subscriber 173 may update its resource subscription with service layer 171 after step 203, for example. In such resource subscription updates, subscriber 173 may include "notifRecordReq" also. Whenever service layer 171 receives a new "notifRecordReq," service layer 171 may use to determine the future notifications to record. If the subscriber 173 does not provide enough information on notification recording requirements, service layer 171 may decide to record notifications based on its local policies. At step 202, service layer 171 may accept the request and accordingly create a subscription resource. At step 203, service layer 171 sends a response to subscriber 173 to inform it of the created subscription resource. At step 204, an event occurs, which meets the event notification criteria provided in step 201.

With continued reference to FIG. 8, at step 205, service layer 171 issues a notification message that is sent to notification target 175. At step 206, notification target 175 sends back a response. At step 206, according to information associated with "notifRecordReq" of step 201, service layer 171 determines whether to create a new notification resource to record the notification message sent in step 206. For example, if notifRecordReq requires recording each and every notification message, service layer 171 may create a notification resource for any issued notification. Each created notification resource may have attributes such as the time when the notification message was issued, the notification condition which triggered the notification message, the subscribed-to-resource associated with the notification message, the list of notification targets 175 which have successfully received the notification message, or the list of notification targets 175 that missed the notification message, among other things. Each created notification resource may have an expiration time; when the expiration time is expired, the created notification resource will be automatically removed. Once the notification resource is created, it may be retrieved by the subscriber or a notification target. For example, step 208 in FIG. 8 shows notification target 175 retrieves this created notification resource.

In FIG. 8, at step 208, assuming, for example, notification target 175 goes offline for some time, when notification target 175 comes back online, it may actively retrieve any missing notifications from service layer 171. Since notification target 175 may not know if there are notification resources being created, it may just send a resource discovery request to the service layer 171 to ask, for example, whether there were notifications being issued for it (notification target 175) within a past time interval. If notification target is offline and did not receive step 205, then it does not know if notification resources are created in step 207. Notification target 175 may also provide additional discovery criteria (e.g., to discover any issued but unsuccessfully received notification messages which were triggered by certain notification conditions). At step 209, service layer 171 may send a response message to notification target 175. The response message may contain multiple notification messages that have been issued but not successfully received by notification target 175 yet or a list of notification messages which meet the discovery criteria as indicated by notification target 175 in step 208. At step 210, subscriber 173 sends a request to actively retrieve (or delete) notification resources which have been created by service layer 171. This step is similar to step 208. A difference is that in step 210, subscriber 173 may request to delete a notification resource to reduce storage at service layer 171 after subscriber 173 discovers the notification resources from service layer 171 and under some conditions (e.g., the corresponding notification message was successfully received by all or preferred notification targets 175). At step 211, service layer 171 sends a response to subscriber 173. If the request in step 210 is to retrieve notification resources, step 211 will be similar to step 209 and the response may contain multiple notification messages. If the request in step 210 is to delete notification resources, the response in step 211 may just inform the result of the deletion request (e.g., approved or rejected).

TABLE 1

Complex Parameter notifRecordReq

| Name | Description |
| --- | --- |
| notifRecordTimeDuration | Indicates a time duration (e.g. [Tstart, Tend]) for recording notifications. In other words, service layer 171 records the notifications which are issued and transmitted within this time duration. Tend may be infinity which may be an indication to record all future notifications. Alternatively, this parameter may indicate the maximum number of notification messages to be recorded. |
| notifRecordType | Indicates the type of notification recording. Some examples are listed below:<br>notifRecordType = 1: Record every notification issued during notifRecordTimeDuration.<br>notifRecordType = 2: Record notifications which are issued during notifRecordTimeDuration and delivered to particular Notification Targets contained in listOfNotifTargetForRecord.<br>notifRecordType = 3: Record notifications which are issued during notifRecordTimeDuration, delivered to particular Notification Targets contained in listOfNotifTargetForRecord, and generated by conditions contained in listOfNotifConditionForRecord.<br>notifRecordType = 4: Record notifications which are issued during notifRecordTimeDuration and generated by conditions contained in listOfNotifConditionForRecord.<br>notifRecordType = 5: Record notifications when a certain number (e.g., notifTargetNumThreshold) of Notification Targets has failed to receive. |

TABLE 1-continued

Complex Parameter notifRecordReq

| Name | Description |
| --- | --- |
| | notifRecordType = 6: Only record notifications which failed for the Notification Targets contained in listOfNotifTargetForRecord. |
| listOfNotifTargetForRecord | A list of notification targets. When this information appears, service layer 171 just records notifications delivered to notification targets in this list. With reference to the example values given above for notifRecordType, this information may only be needed if notifRecordType = 2 or 3. |
| listOfNotifConditionForRecord | A list of notification conditions. When this information appears, service layer 171 just records notifications triggered by conditions in this list. With reference to the example values given above for notifRecordType, this information may only be needed if notifRecordType = 3 or 4. |
| notifTargetNumThreshold | Indicates a threshold value. Service layer 171 may use this parameter to determine to record a notification message if the number of notification targets that missed this notification message exceeds this threshold parameter. With the example values given above for notifRecordType, this information may only be needed if notifRecordType = 5. |
| notifResourceLifeTime | Indicates the expiration time of each notification resource to be created. |

Figure 9:
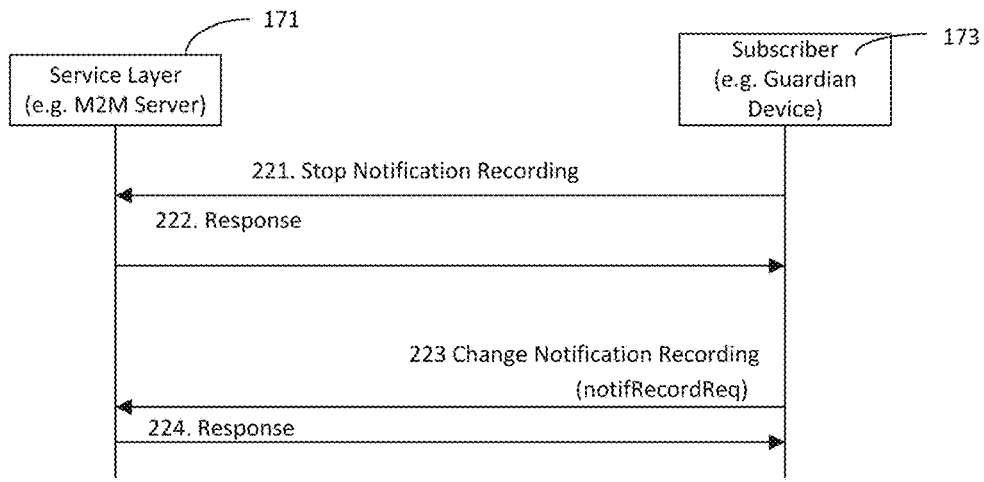
FIG. 9 illustrates an exemplary method to stop or change notification recording.

FIG. 8 illustrates that subscriber 173 may request service layer 171 record notifications. Subscriber 173 may also request service layer 171 to stop or change notification recording, as illustrated in FIG. 9. It is understood that other entities may also request to stop or change notification recording when they have access rights. There may be different reasons to restrict access, such as certain privacy issues.

With continued reference to FIG. 9, at step 221, subscriber 173 sends a request message to service layer 171 to stop recording notifications. This message may just indicate the corresponding or associated subscription. Alternatively, subscriber 173 may include a parameter, such as an invalid notifRecordTimeDuration as part of the notifRecordReq (e.g. [−20,−10]) in the message that indicates stop notification recording. At step 222, service layer 171 sends a response to subscriber 173 that indicates whether the request in step 221 is approved or rejected. At step 223, subscriber 173 may also send a request message to service layer 171 to change how future notifications should be recorded. This message may contain new values for the parameter "notifRecordReq." If notification recording was stopped previously, this request at step 223 may indirectly resume notification recording. The recorded notification resources may actively be deleted by subscriber 173 or expire because each notification resource has an associated expiration time. At step 224, service layer 171 sends a response to subscriber 173 that indicates whether the request in step 223 is approved or rejected.

Discussed below are methods and systems for maintaining notification statistical information at service layer 171. Service layer 171 may maintain statistical information about past notifications issued during a time window instead of each single notification. Note that the time window may be a real time window based on the time when a notification message was issued or a virtual time window that just contains a fixed number of notification messages. Examples of statistical information may include the average number of issued notifications in a time window, the number of successfully received notifications by notification target 175 in a time window, the maximum number of continuously unsuccessful notifications to notification target 175 in a time window, or the number of unsuccessful notification attempts to a particular notification target 175, among other things. Subscriber 173 may request service layer 171 to calculate one or more parameters of notification statistical information during subscription request. Then, service layer 171 may continue to re-calculate notification statistical information whenever a new notification is issued and transmitted to a notification target 175. Once the notification statistical information is generated by service layer 171, subscriber 173 may retrieve it and based on notification statistical information, it may decide to remove notification target 175 (e.g., if notification target 175 has missed all or a high percentage of notifications issued recently) or add a new notification target 175 (e.g., if all or a high percentage of notification targets 175 cannot receive any notifications). As such, a separate request message will be sent from subscriber 173 to service layer 171 to adjust (remove or add) notification target 175. In another example, service layer 171 may perform one-time on-demand calculation of notification statistical information on a particular subscription, based on a request from subscriber 173 or other entities; this on-demand notification statistical information calculation may be more efficient if there are very few requests for notification statistical information.

Figure 10:
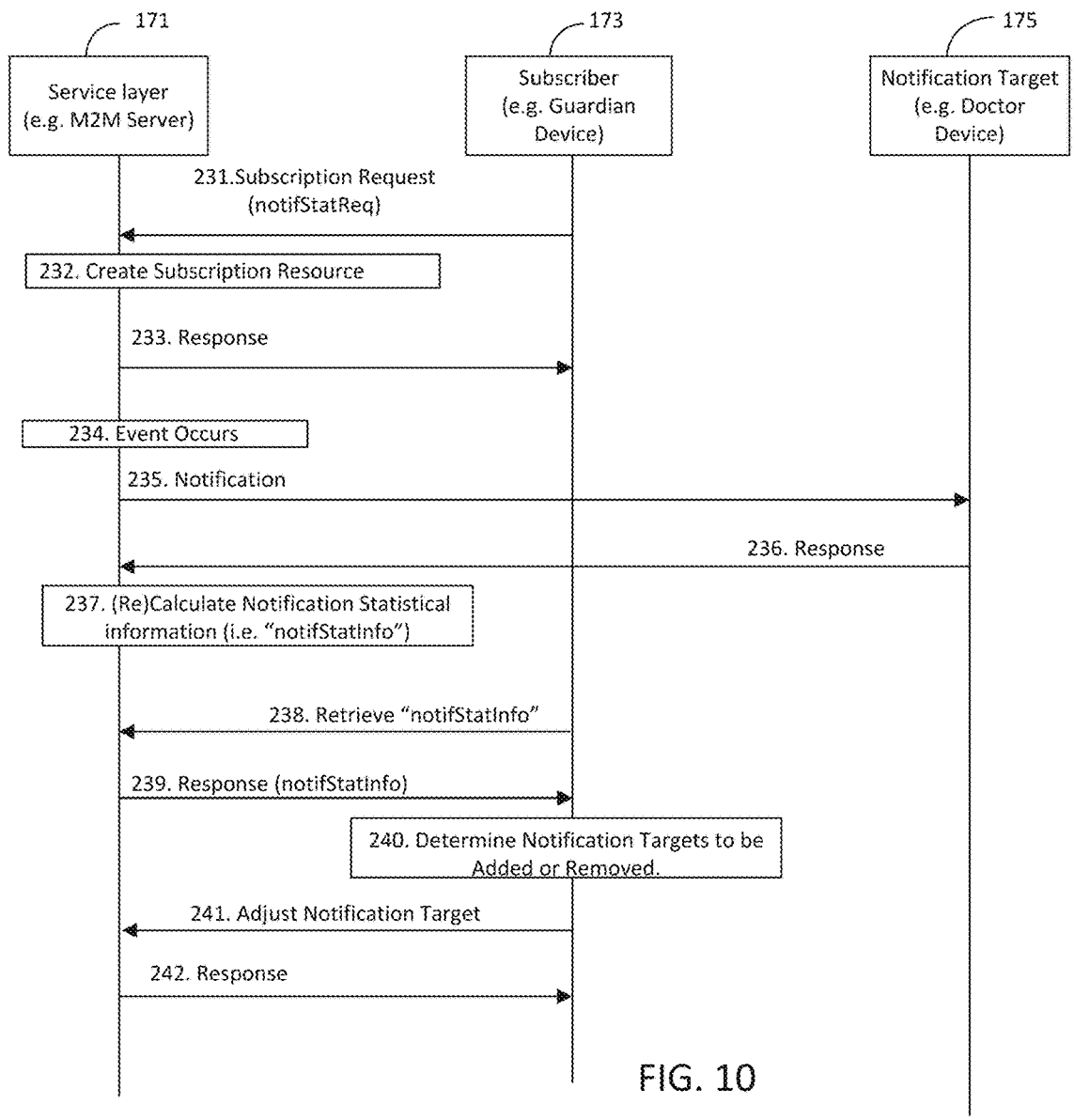
FIG. 10 illustrates an exemplary method for maintaining and accessing notification statistical information.

FIG. 10 illustrates an exemplary method for maintaining and accessing notification statistical information. At step 231, subscriber 173 sends a subscription request message to service layer 171. The request of step 231 may include information such as event notification criteria as well as parameter "notifStatReq." This notifStatReq parameter may include instructions for the notification statistical information to calculate or maintain. Table 2 defines notifStatReq. Subscriber 173 may update its resource subscription with service layer 171 after step 233. In the resource subscription updates, subscriber 173 may include "notifStatReq" even if it is included in step 231. Whenever service layer 171 receives a new "notifStatReq," service layer 171 will use it for calculating future notification statistical information. At step 232, service layer 171 accepts the request and accordingly creates a subscription resource. At step 233, service layer 171 sends a response to subscriber 173 that provides information about the creation of the subscription resource.

The response message may also include the address of "notifStatInfo" although it is to be (re-) calculated in step 237, so that subscriber 173 is able to use this address to directly retrieve "notifStatInfo" in step 238.

At step 234, an event occurs that meets the event notification criteria provided in step 231. At step 235, service layer 171 sends a notification message to notification target 175. At step 236, notification target 175 sends back a response. At step 237, service layer 171 (re-)calculates notification statistical information according to requirements of subscriber 173 indicated by the parameter "notifStatReq." The calculated notification statistical information is maintained in a new parameter "notifStatInfo," which may be created as a new resource or added as a new attribute to the subscription resource being created in step 232. Alternatively, service layer 171 may maintain all calculated notification statistical information, not only the latest one, for example if it has enough storage.

At step 238, subscriber 173 retrieves (or discovers if it does not know the address of "notifStatInfo") "notifStatInfo" from service layer 171. At step 239, service layer 171 sends the response (e.g., the values of "notifStatInfo") back to subscriber 173. At step 240, subscriber 173 may decide to remove or add any notification target 175 based on notification statistical information. In an example, if notification target 175 has missed all or a threshold percentage of notifications issued within a current time window, the subscriber 173 may decide to remove notification target 175. In another example, new notification target 175 may be added, if all or a threshold percentage of notification targets cannot receive any notifications within a current time window. At step 241, subscriber 173 may send a request to service layer 171 to adjust (e.g., remove, add, or otherwise adjust) notification target 175 according to a decision made in step 240. At step 242, service layer 171 sends the result (e.g., accepted or rejected the adjustment) to subscriber 173.

TABLE 2

Definition of notifStatReq

| Name | Description |
|---|---|
| notifStatTimeWindowLength | Indicates the length of the time window for calculating the notification statistical information. This time window may be a periodic time window. It may be first initiated by the request from the subscriber 173. Alternatively, this parameter may just indicate an integer number (e.g. N), which means that the statistical information will be calculated for every N notification messages. |
| listOfNotifStatTypes | Indicates a list of notification statistical types. Each item in this list stands for a type of statistical information (referred to as notifStatType), for example: notifStatType = 1: The average number of issued notifications in the time window. notifStatType = 2: The number of successfully received notifications by notification target 175 in the time window. notifStatType = 3: The maximum number of continuously unsuccessful notifications to notification target 175 in the time window. notifStatType = 4: The minimum time interval between two consecutive notifications issued within the time window. notifStatType = 5: The maximum time interval between two consecutive notifications issued within the time window. notifStatType = 6: The number of unsuccessful notifications to a particular notification target 175 within the time window. |
| statCalcRepeat | Indicates the number of notification statistical information calculations. This information basically tells service layer 171 if the request for calculating notification statistical information is one-time operation (e.g. when this number is equal to one) or will be repeated multiple times (i.e. if this number is larger than 1). If this number is not included in notifStatReq, service layer 171 may keep calculating notification statistical information. |
| listOfNotifTargetsForStat | Stands for a list of notification targets. When this information appears, service layer 171 only needs to calculate statistical information about notifications transmitted to notification targets in this list. With the examples given above for notifStatType, this information may only be needed if notifStatType = 2 or 3 is contained in listOfNotifStatTypes. |

Discussed below is notification confirmation from service layer 171 to subscriber 173. Instead of recording notifications or calculating notification statistical information, another approach is to let subscriber 173 have access to information about past notifications. Service layer 171 may actively send a notification confirmation to subscriber 173 when a notification is transmitted to one or all notification targets. Basically, after a notification message is successfully received by notification target 175, service layer 171 may send a notification confirmation message to subscriber 173 to inform it of this notification message. If there are multiple notification targets, the same notification message may be transmitted multiple times. In order to reduce the number of notification confirmation messages, service layer 171 may send only one notification confirmation message to the subscriber 173 after the same notification message has been transmitted to all notification targets. Furthermore, subscriber 173 may request service layer 171 to send a notification confirmation message, when a certain number of notification messages has been transmitted to one or all notification targets. Similar to the approach above, subscriber 173 may adjust (e.g., remove, add, or otherwise adjust) notification targets based on the information from notification confirmation.

Figure 11:
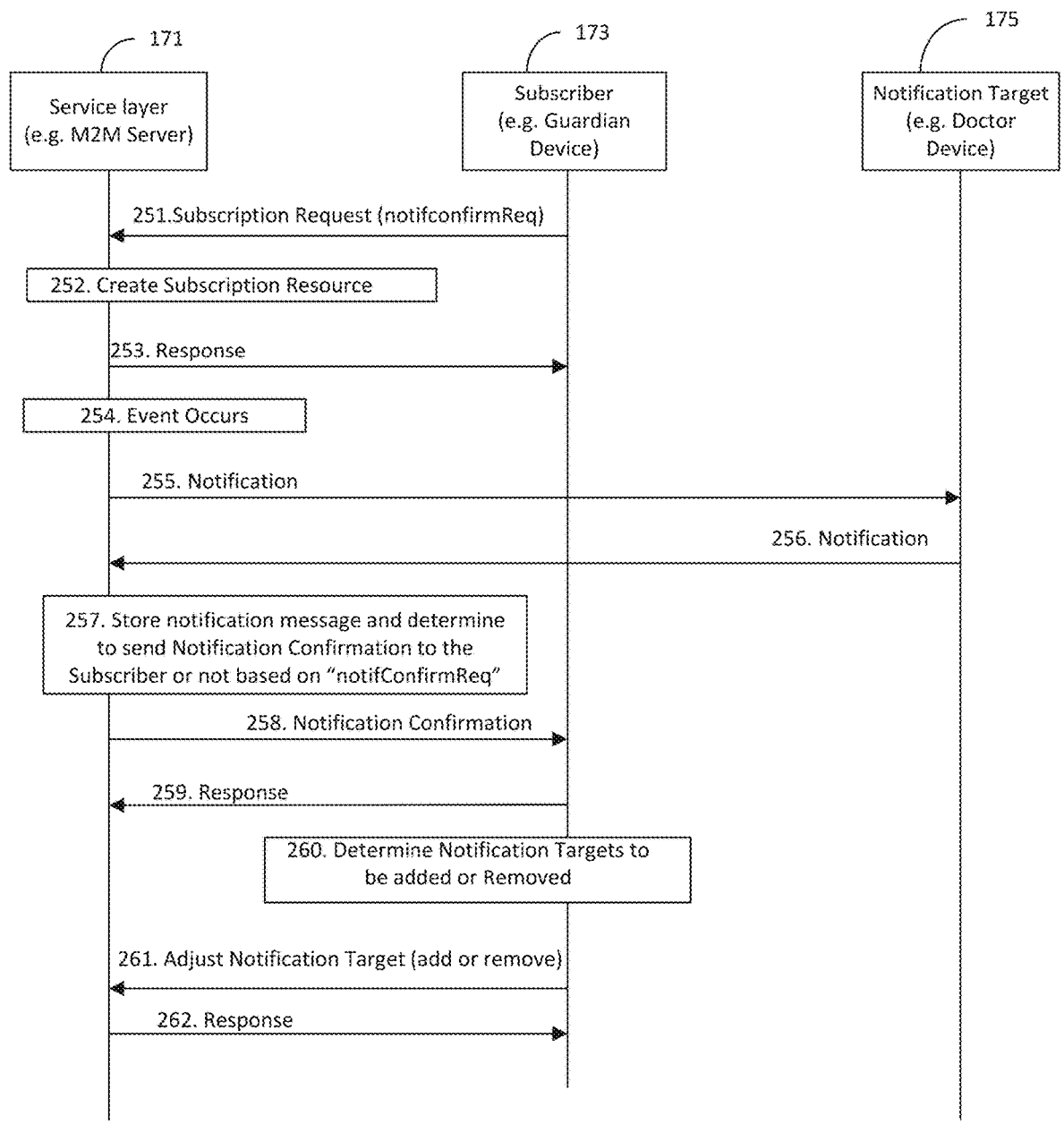
FIG. 11 illustrates an exemplary method for sending notification confirmation from service layer to the subscriber.

FIG. 11 illustrates an exemplary method for sending notification confirmation from service layer 171 to the subscriber 173. At step 251, subscriber 173 sends a subscription request message to service layer 171. In addition to information like event notification criteria, the message of step 251 may include parameter "notifConfirmReq." This notifConfirmReq parameter tells service layer 171 which notifications should be confirmed with the subscriber 173. Table 3 defines this complex parameter. Subscriber 173 may update its resource subscription with service layer 171 after step 253. In resource subscription updates, subscriber 173 may include "notifConfirmReq" also even if it is included in step 251. Whenever service layer 171 receives a new "notifConfirmReq," service layer 171 may use it for confirming future notifications. At step 252, service layer 171 accepts the request and accordingly creates a subscription resource. At step 253, service layer 171 sends a response to subscriber 173 to inform it of the created subscription resource.

With reference to FIG. 11, at step 254, an event occurs, which meets the event notification criteria contained in step 251. At step 255, service layer 171 sends a notification message to notification target 175. At step 256, notification target 175 sends back a response, which tells the service layer 171 that the notification at step 255 was successfully received. At step 257, service layer 171 stores the notification message and determines whether it needs to send a notification confirmation to subscriber 173 based on "notifConfirmReq." At step 258, service layer 171 sends a notification confirmation message to subscriber 173. This message may contain one or more notification messages which have been successfully sent to notification targets.

At step 259, subscriber 173 sends a response back to service layer 171; the response at step 259 just simply tells the service layer 175 that notification confirmation at step 258 was successfully received. At step 260, subscriber 173 may decide to remove or add notification target 175. In an example with regard to removing notification target 175, notification target 175 may be removed if it has missed all or a threshold percentage of notifications issued within a time window. In an example with regard to adding notification target 175, it may be added if all or a high percentage of other notification targets cannot receive any notifications within the current time window. At step 261, subscriber 173 sends a request to service layer 171 to adjust notification targets according to decisions made in step 260. At step 262, service layer 171 sends the result (e.g., accepts or rejects the adjustment) to subscriber 173.

TABLE 3

Definition of notifConfirmReq

| Name | Description |
|---|---|
| notifConfirmType | Indicates the type of notification confirmation which subscriber 173 requests, for example:<br>notifConfirmType = 1: Require service layer 171 send a notification confirmation to subscriber 173 each time a notification message is issued and delivered to notification target 175.<br>notifConfirmType = 2: Require service layer 171 send a notification confirmation to the subscriber 173 after the notification message has been transmitted to the notification targets.<br>notifConfirmType = 3: Require service layer 171 send a notification confirmation to subscriber 173 after a certain number (i.e. notifNumForConfirm) of different notification messages have been issued to all notification targets.<br>notifConfirmType = 4: Require service layer 171 send a notification confirmation to the subscriber 173 each time a notification message is issued and delivered to a notification target 175 which is included in listOfNotifTargetsForConfirm.<br>notifConfirmType = 5: Require service layer 171 send a notification confirmation to the subscriber 173 after notification message has been delivered to all notification targets included in listOfNotifTargetsForConfirm.<br>notifConfirmType = 6: Require service layer 171 send a notification confirmation to subscriber 173 after a certain number (e.g., notifNumForConfirm) of different notification messages have been delivered to all notification targets included in listOfNotifTargetsForConfirm.<br>notifConfirmType = 7: Require service layer 171 send a notification confirmation to subscriber 173 after there are a certain number of failed notification attempts (as indicated by failedNotifNumForConfirm) to notification targets (contained in listOfNotifTargetsForConfirm). |

TABLE 3-continued

Definition of notifConfirmReq

| Name | Description |
| --- | --- |
| notifNumForConfirm | With the examples given above for notifConfirmType, this information may only be needed if notifConfirmType = 3 or 6. |
| failedNotifNumForConfirm | With the examples given above for notifConfirmType, this information may only be needed if notifConfirmType = 7. |
| listOfNotifTargetsForConfirm | With the examples given above for notifConfirmType, this information may only be needed if notifConfirmType = 4, 5, 6, or 7. |

Previous methods introduce new features to service layer 171 and rely on it to provide the access to information about notifications to subscriber 173 or notification targets. Disclosed below are direct interactions between subscriber and notification targets. These interactions may be considered application-level interactions since subscriber 173 and notification targets will be applications in most cases. This alternative approach however may not help service layer 171 avoid sending unnecessary notifications and may not provide instructions for notification target 175 to retrieve missing notifications. The direct interactions between subscriber 173 and notification target 175 may include: 1) subscriber 173 requests notification target 175 to calculate the statistical information about notifications it has received from service layer 171 and the calculated statistical information may be actively reported back to subscriber 173 or passively waiting for the subscriber 173 to retrieve; and 2) subscriber 173 requests notification target 175 to send a notification confirmation for each or multiple notifications it has received from service layer 171.

Figure 12:
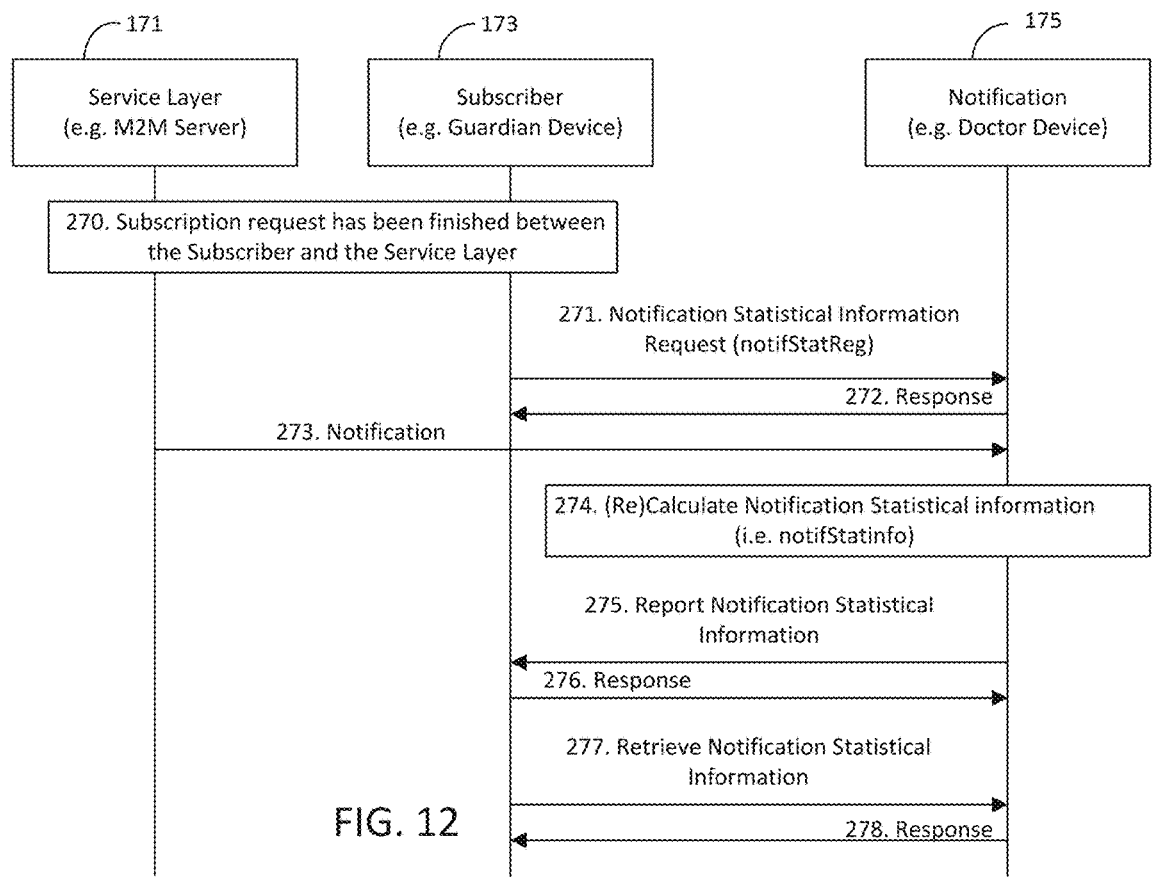
FIG. 12 illustrates an exemplary method where subscriber directly requests a notification target to calculate notification statistical information.

FIG. 12 illustrates an exemplary method where subscriber 173 directly requests notification target 175 to calculate notification statistical information. At step 270, it is assumed that the subscription request has been completed between subscriber 173 and service layer 171. At step 271, subscriber 173 sends a request message to notification target 175 to inform it which kind of notification statistical information needs to be calculated. In this message, a parameter notifStatReq is contained to indicate the requirement of subscriber 173 for notification statistical calculation. notifStatReq is defined in Table 2. At step 271, notification target 175 sends a response back to subscriber 173. In this message of step 271, notification target 175 may include the URI of notification statistical information which is to be calculated in step 274, so that subscriber 173 may actively retrieve the notification statistical information later (e.g. in step 277). At step 273, when an event of interest happens to the subscribed resource at service layer 171, service layer 171 sends a notification message to notification target 175.

At step 274, notification target 175 (re)calculates notification statistical information according to notifStatReq received in step 271. The calculated notification statistical information may be stored in a complex parameter or a placeholder, referred to as "notifStatInfo." At step 275, notification target 175 reports the calculated statistical information to subscriber 173. In this message, notification target 175 may include the URI of notification statistical information so that subscriber 173 may actively retrieve the notification statistical information later (e.g. in step 277).

With continued reference to FIG. 12, at step 276, subscriber 173 sends a response back to notification target 175 as a confirmation. At step 277, subscriber 173 actively retrieves the notification statistical information from notification target 175 using its URI as obtained from step 272 or step 275. At step 277, notification target 175 sends a response back to subscriber 173.

Figure 13:
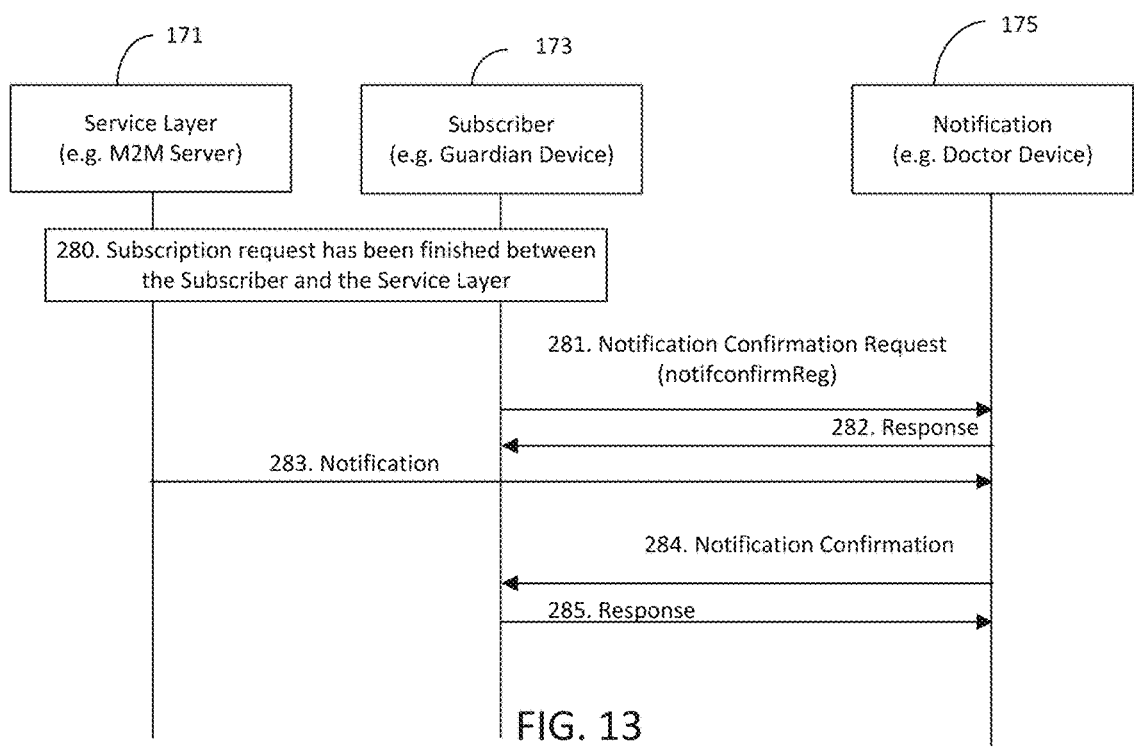
FIG. 13 illustrates an exemplary method for subscriber to request notification confirmation from notification target.

FIG. 13 illustrates an exemplary method for subscriber 173 to request notification confirmation from notification target 175. The main idea is that notification target 175 will send a notification confirmation message to subscriber 173 once it receives one or more notification messages from service layer 171. At step 280, it is assumed that the subscription request has been completed between subscriber 173 and service layer 171. At step 281, subscriber 173 sends a message to notification target 175 requesting it to send back notification confirmation when notification messages are received from service layer 171. This message may include a parameter notifConfirmReq to indicate the requirements of subscriber 173 on notification confirmation. notifConfirmReq has been defined in Table 3. For this example, there is one notification target 175, "listOfNotifTargetsForConfirm" field of notifConfirmReq will be notification target 175 which is receiving the message in this step. At step 282, notification target 175 sends a response message to subscriber 173 as a confirmation. At step 283, when an event of interest happens to the subscribed resource at service layer 171, service layer 171 sends a notification message (e.g., event notification message) to notification target 175. At step 284, notification target 175 sends a notification confirmation to subscriber 173. This message may be similar to step 258 in FIG. 11. Notification target 175 may issue this message after it receives one notification or multiple notifications from service layer 171, which is designated in the received parameter notifConfirmReq. At step 285, subscriber 173 sends a response back to notification target 175 as a confirmation.

A problem described herein is the unawareness of service layer 171 about the state of a notification target. Disclosed below are methods and systems associated with keeping the service layer 171 aware. In summary, first, service layer 171 after receiving a new subscription request from subscriber 173 checks with corresponding notification targets and make them aware of this new subscription to be created; during this process, notification target 175 may ask service layer 171 to remove it from this new subscription or instruct service layer 171 how notifications should be appropriately sent to it. This helps resolve the lack of awareness of notification target 175 about the subscription. Second, after a new subscription is created, notification targets may actively report their status (e.g., availability, expected notification rate, etc.) to service layer 171 and piggyback their status in the response message to service layer 171; in turn service layer 171 may adjust how future notifications should be transmitted according to the latest status of notification targets.

Figure 14:
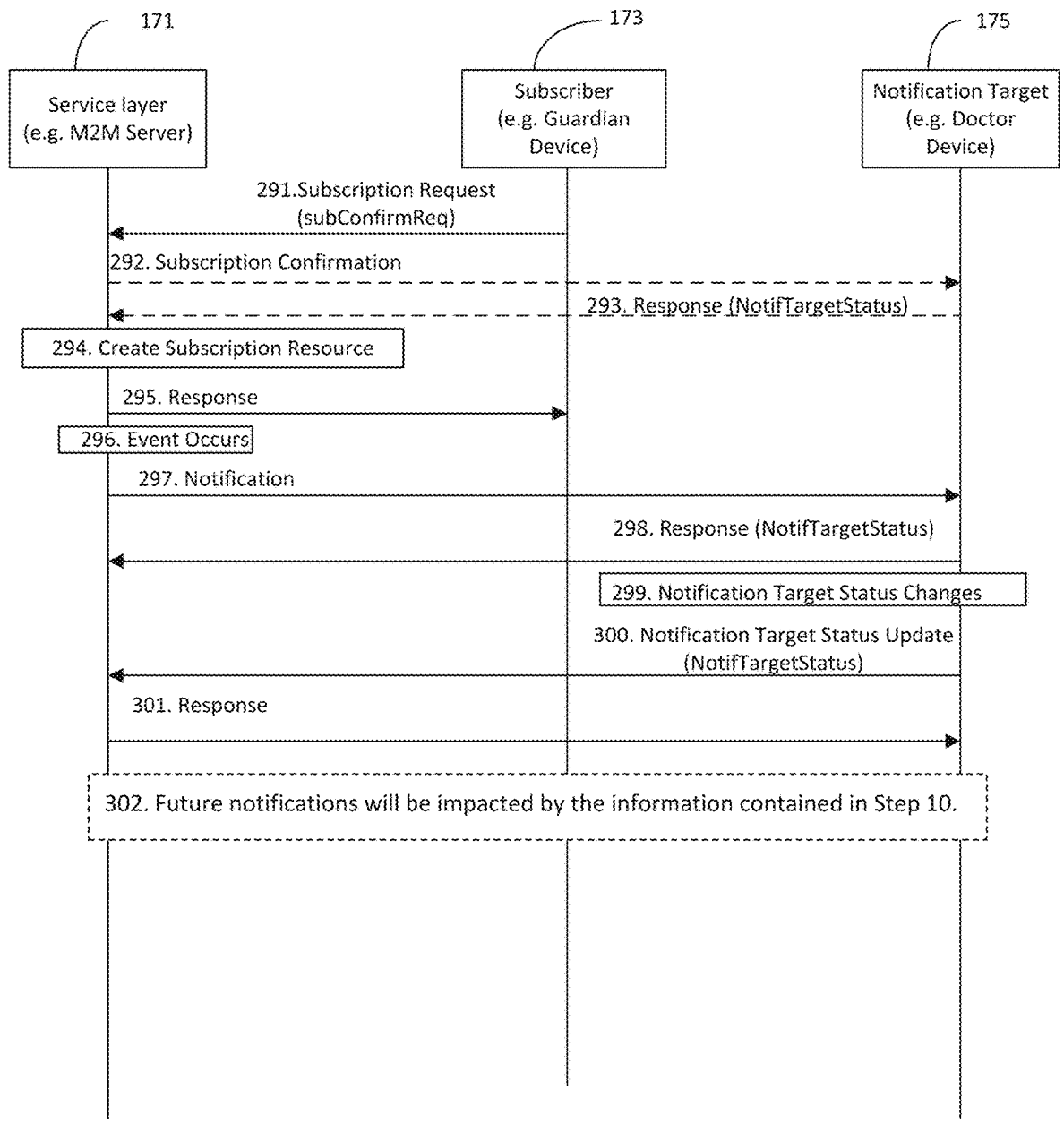
FIG. 14 illustrates an exemplary method for enabling awareness between notification targets and subscriber and between notification targets and service layer.

FIG. 14 illustrates an exemplary method for enabling awareness between notification targets and subscriber 173 and between notification targets and service layer 171. At step 291, subscriber 173 sends a subscription request message to service layer 171. In addition to information like notification (e.g., event notification) criteria, this message may include parameter "subConfirmReq." This subConfirmReq parameter tells service layer 171 which notification target 175 should be contacted to confirm the subscription request. Table 4 defines subConfirmReq. At step 292, if subConfirmType in subConfirmReq is not equal to zero, service layer 171 sends a subscription confirmation message to corresponding notification targets. This message may include the following parameters or just include the subscription request message in step 291: 1) the address or identifier of subscriber 173; 2) the address or identifier of the subscribed resource; 3) the addresses for notification target 175 to receive notifications; or 4) the event notification criteria.

At step 293, notification target 175 sends back a response to service layer 171. If notification target 175 is not willing to receive notifications of this subscription, it may ask service layer 171 to remove it from the list of notification targets given by subscriber 173 in step 291. In addition, notification target 175 may also piggyback its current status (e.g., "notifTargetStatus") in this response message. "notifTargetStatus" may include the following situational information about notification target 175: 1) new network (e.g., IP) address of notification target 175 for receiving future notifications; 2) allowed maximum notification arrival rate (e.g. 2 notifications/second); or 3) the schedule information of this notification target 175 (e.g. will be available for next 30 minutes, will be unavailable for next 2 days, etc.). At step 294, service layer creates a subscription resource. At step 295, service layer 171 sends a response to subscriber 173 to inform it of the created subscription resource. If notification target 175 requests to be removed during step 293, service layer 171 may include the address or identifier of that notification target 175 in this step 295. At step 296, an event occurs, which meets the event notification criteria contained in step 291. At step 297, service layer 171 sends a notification message to notification target 175. Note that if notification target 175 indicates "Allowed Maximum Notification Rate" in step 293, service layer 171 may not send this notification message to it if the "Allowed Maximum Notification Rate" is violated. Also note that the subscription confirmation message in step 292 alternatively may be contained in step 297 if this notification is the first notification issued to notification target 175. In this case, step 292 and step 293 may be skipped.

With continued reference to FIG. 14, at step 298, notification target 175 sends back a response, which may contain notification target 175 status information (e.g., notifTargetStatus). At step 299, the status of notification target 175 may change. For example, its previous address for receiving notifications becomes unavailable. At step 300, notification target 175 updates service layer 171 about its new status. This message contains "notifTargetStatus." Step 300 may be considered active and step 298 may be considered passive. Step 298 is a result of receiving step 297, while step 300 may happen at almost any time. At step 301, service layer 171 sends a response back to notification target 175. At step 302, service layer maintains the status of each notification target 175 and accordingly adjusts how notifications should be transmitted to them in the future.

TABLE 4

Definition of subConfirmReq

| Name | Description |
| --- | --- |
| subConfirmType | Indicates subscription confirmation type, for example:<br>subConfirmType = 0: There is no need for service layer 171 to contact any notification target 175 to keep it aware of this subscription.<br>subConfirmType = 1: Requires service layer 171 to contact all notification targets and keep them aware of this subscription.<br>subConfirmType = 2: Requires service layer 171 to contact only a subset of notification targets contained in listOfNotifTargetsForSubConfirm and keep them aware of this subscription. |
| listOfNotifTargetsForSubConfirm | Indicates the list of notification targets which service layer 171 should contact for subscription confirmation. With the examples given above for subConfirmType, this information may only be needed if subConfirmType = 2. |

Below are examples for implementing oneM2M architecture methods for subscription and notification, as disclosed herein.

Figure 15:
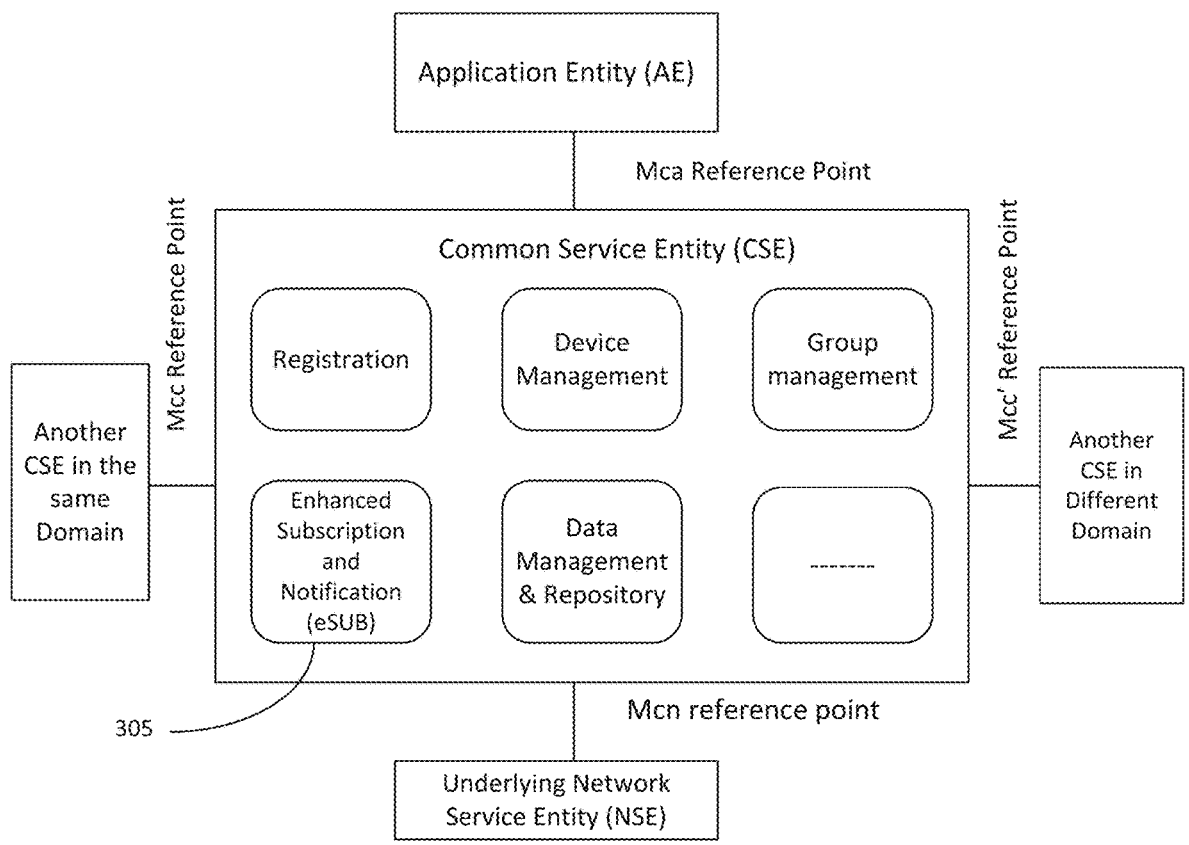
FIG. 15 illustrates an exemplary Enhanced Subscription and Notification (eSUB) CSF.

FIG. 15 illustrates an exemplary CSF for implementing the methods for subscription and notification service to conventional oneM2M SUB CSF to form an Enhanced Subscription and Notification (eSUB) CSF 305 based on the conventional oneM2M functional architecture. This eSUB supports procedures and processes among service layer 171, subscriber 173, and notification target 175 as described herein. eSub may reside in IN-CSE, MN-CSE, or ASN-CSE. The resources and procedures related to service layer 171 may be implemented in a CSE, and subscriber 173 may be an AE or a CSE (e.g., M2M terminal device 18 of FIG. 20A and gateway device 14 of FIG. 20A, respectively).

Below are deployment examples. For a record notification at service layer method, service layer 171 may be a CSE (e.g., an IN-CSE), while subscriber 173 may be an AE (e.g., an IN-AE) or a CSE (e.g., an ASN-CSE). For a method based on maintaining notification statistic information at the service layer, service layer 171 may be a CSE (e.g., an MN-CSE), while subscriber 173 may be an AE (e.g. an ADN-AE). For a method based on notification confirmation from the service layer, service layer may be a CSE (e.g. an IN-CSE), while subscriber 173 may be an AE (e.g. an IN-AE). For a method based on notification target status awareness, service layer 171 may be a CSE (e.g. an IN-CSE), while subscriber 173 may be an AE (e.g. an IN-AE) or a CSE (e.g. An MN-CSE). As disclosed herein, the method for notification target awareness (e.g., FIG. 14) may include obtaining, from a subscriber, a first subscription request to receive an event notification of a resource by a subscriber device, the first subscription request comprising a first parameter that tells which notification target should be contacted to confirm the first subscription request; based on the first subscription request, sending a message to the notification target, the message comprising an identifier of a subscriber, an identifier of a subscribed resource, an identifier for the notification target to receive notifications, or event notification criteria; and generating a resource to record a notification message based on the first subscription request.

Figure 16:
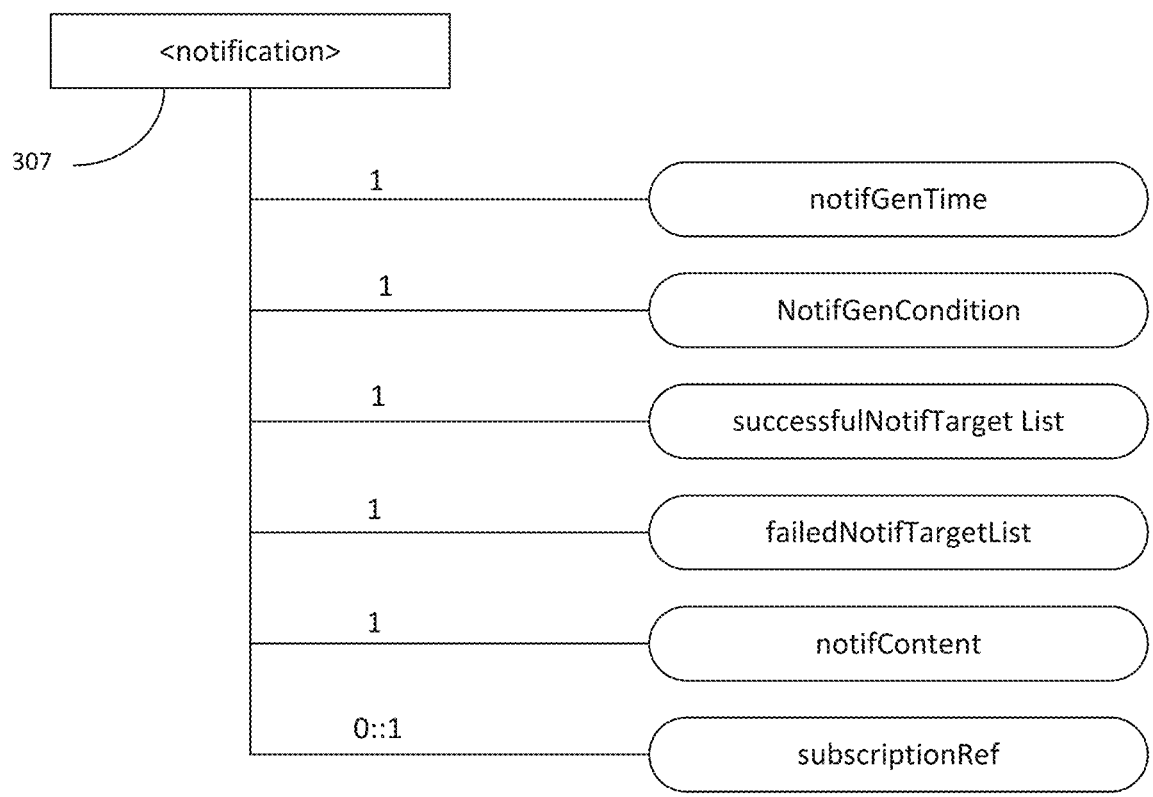
FIG. 16 illustrates an exemplary <notification> resource.

As shown in FIG. 16, to support the methods discussed herein, a new resource (<notification> 307) is disclosed. The <notification> resource 307 may be automatically created by service layer 171 when a notification message is issued and transmitted to a notification target 175 (or created under other situations dependent on the parameter notifRecordReq). Once <notification> resource 307 is created, it may be retrieved by subscriber 173 or notification targets. Subscriber 173 may also delete <notification> 307 message.

The <notification> resource 307 has several new attributes as illustrated in FIG. 16 and described in Table 5. Note that <notification> 307 may also be implemented as a type of oneM2M <flexContainer> or <container> resource; as such, attributes of <notification> 307 shown in FIG. 16 may be introduced as new attributes for <flexContainer> or <container>. The <notification> resource 307 may be placed in various places (e.g., a child resource of a <subscription> resource, a child resource of a <AE> resource, a child resource of a <remoteCSE> resource, etc.). When <notification> 307 is placed under a <subscription> resource as its child resource, <notification> 307 actually records notification messages being generated for this <subscription> resource. When <notification> 307 is placed under an <AE> resource as its child resource and this <AE> resource is a subscriber 173, <notification> resources 307 in this case represent notification message being generated for <subscription> resources from this <AE> as a subscriber 173.

TABLE 5

Attributes of New <notification> Resource

| Attributes of <notification> | Description |
|---|---|
| notifGenTime | Indicates the time when the corresponding notification message (as denoted by notifContent) was issued and transmitted to a notification target 175. |
| notifGenCondition | Indicates the condition which triggers service layer 171 to issue the corresponding notification message as denoted by notifContent. |
| successfulNotifTargetList | Indicates the list of notification targets which have successfully received the corresponding notification message as denoted by notifContent. |
| failedNotifTargetList | Indicates the list of notification targets which have not successfully received the corresponding notification message as denoted by notifContent. |

TABLE 5-continued

Attributes of New <notification> Resource

| Attributes of <notification> | Description |
|---|---|
| notifContent | Represents the content of the notification message which service layer 171 issued and was recorded by this <notification> resource. |
| subscriptionRef | Is a reference to the corresponding <subscription> resource, for which notification messages are issued. Through this attribute, it is able to know and access the associated subscriber 173, the associated notification targets, and other attributes of the <subscription> resource. |

As previously mentioned, <notification> resource may be automatically created by service layer 171 when a notification message is issued or dependent on the requirements of subscriber 173 as indicated by notifRecordReq parameter during subscription request. After a <notification> resource is created, it may be retrieved by subscriber 173 or notification target 175, or deleted by subscriber 173. Allowed operations on <notification> resource are listed in Table 6.

TABLE 6

Allowed Operations on <notification> Resource

| Operations | Allowed | Originator | Receiver |
|---|---|---|---|
| CREATE | YES (automatically done by service layer 171 - a CSE) | N/A | N/A |
| RETRIEVE | YES | An AE or a CSE (e.g., subscriber 173), notification targets | CSE which creates <notification> resource |
| UPDATE | NO | N/A | N/A |
| DELETE | YES | An AE or a CSE (e.g., subscriber 173) | CSE which creates <notification> resource |
| NOTIFY | NO | N/A | N/A |

According to the requirements from the subscriber 173 (e.g., notifRecordReq parameter being submitted during subscription request), service layer 171 (e.g., a CSE) automatically determines to create a new <notification> message when it issues a notification to notification target 175. When a <notification> resource is created, all its attributes as listed in Table 5 will be generated by service layer 171.

This procedure may be used to retrieve attributes of a <notification> resource (e.g. by subscriber 173 or notification targets). The generic retrieve procedure is described in clause 10.1.2 in oneM2M-TS-0001, oneM2M Functional Architecture, V-2.6.0 (hereinafter oneM2M Functional Architecture).

TABLE 7

| <notification> RETRIEVE | |
|---|---|
| <notification> RETRIEVE | |
| Associated Reference Point | Mca, Mcc and Mcc' |
| Information in Request message | All parameters defined in table 8.1.2-3 in oneM2M Functional Architecture apply with the specific details for: Content: void |
| Processing at Originator before sending Request | According to clause 10.1.2 in oneM2M Functional Architecture |

TABLE 7-continued

| | |
|---|---|
| | <notification> RETRIEVE |
| | <notification> RETRIEVE |
| Processing at Receiver | According to clause 10.1.2 in oneM2M Functional Architecture |
| Information in Response message | All parameters defined in table 8.1.3-1 in oneM2M Functional Architecture apply with the specific details for: Content: attributes of the <notification> resource |
| Processing at Originator after receiving Response | According to clause 10.1.2 in oneM2M Functional Architecture |
| Exceptions | According to clause 10.1.2 in oneM2M Functional Architecture |

The <notification> DELETE method may be used by subscriber 173 to remove a <notification> resource. The generic delete procedure is described in clause 10.1.4.1 in oneM2M Functional Architecture.

TABLE 8

| | |
|---|---|
| | <notification> DELETE |
| | <notification> DELETE |
| Associated Reference Point | Mca, Mcc and Mcc'. |
| Information in Request message | All parameters defined in table 8.1.2-3 in oneM2M Functional Architecture apply. |
| Processing at Originator before sending Request | According to clause 10.1.4.1 in oneM2M Functional Architecture. |
| Processing at Receiver | According to clause 10.1.4.1 in oneM2M Functional Architecture. |
| Information in Response message | According to clause 10.1.4.1 in oneM2M Functional Architecture. |
| Processing at Originator after receiving Response | According to clause 10.1.4.1 in oneM2M Functional Architecture. |
| Exceptions | According to clause 10.1.4.1 in oneM2M Functional Architecture. |

Figure 18:
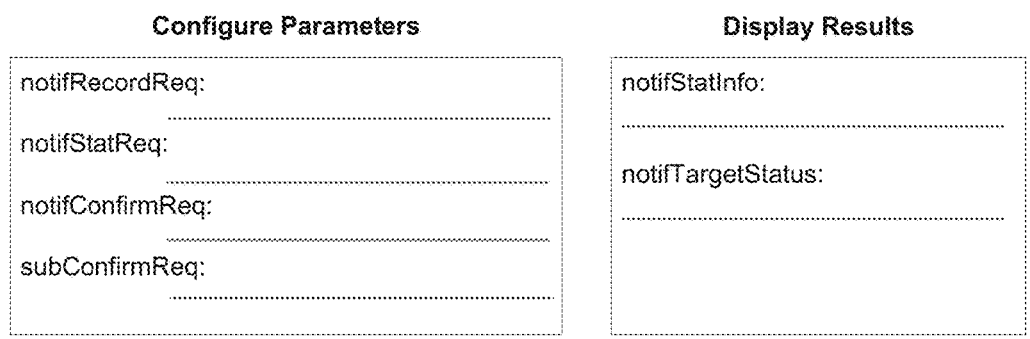
FIG. 18 illustrates an exemplary user interface.

As shown in FIG. 18, a new resource (<notifTarget> 315) is disclosed to maintain the status information about each notification target 175. Subscriber 173 or notification targets may request to create <notifTarget> resource 315 at service layer 171 (e.g., the CSE which hosts corresponding <subscription> resource). Once <notifTarget> resource 315 is created, it may be retrieved/updated/deleted by subscriber 173 or notification targets (even by other AEs and CSEs).

Figure 17:
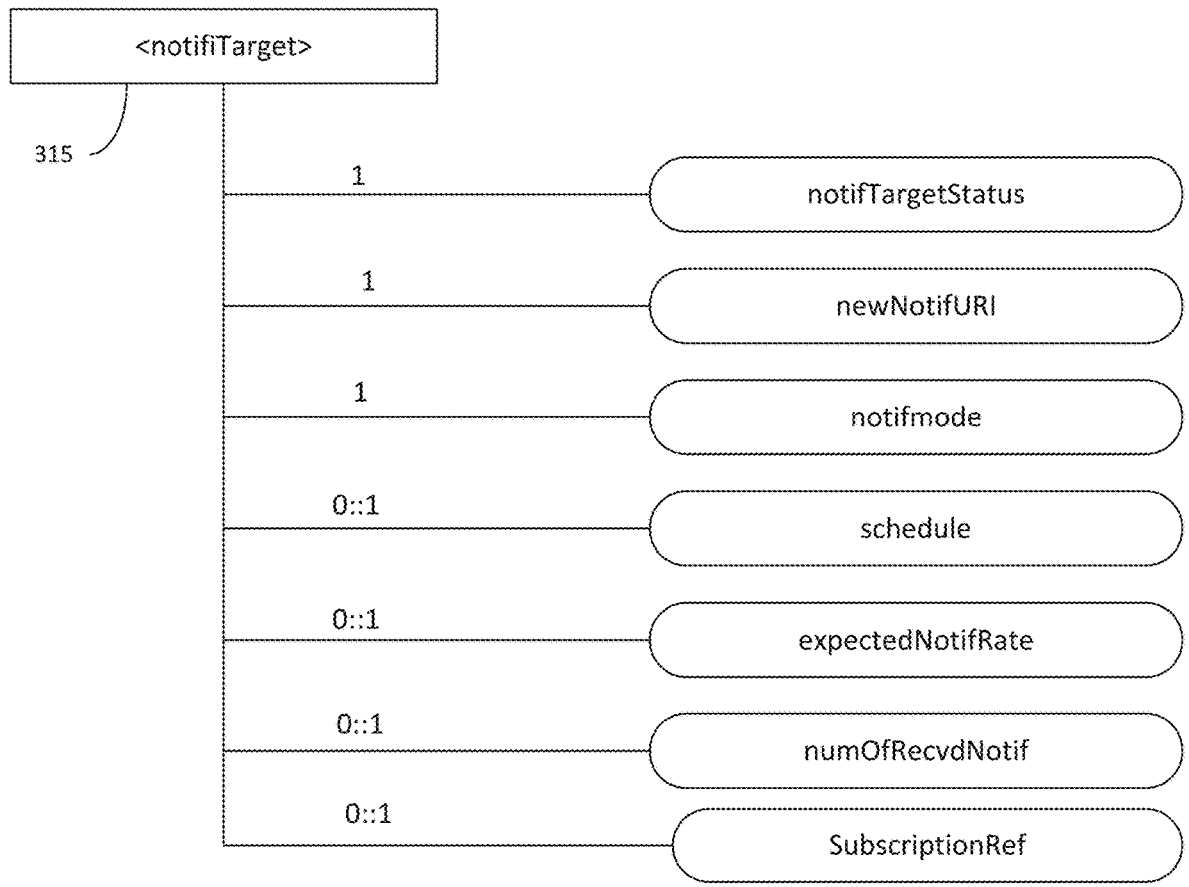
FIG. 17 illustrates an exemplary <notifTarget> resource.

The <notifTarget> resource 315 has several new attributes as illustrated in FIG. 17 and described in Table 9, and it may be placed in various places (e.g. a child resource of a <subscription> resource, a child resource of an <AE> resource, a child resource of a <remoteCSE> resource, etc.). When <notifTarget> 315 is placed under a <subscription> resource as its child resource, <notifTarget> 315 represents a notification target 175 which is associated with this <subscription> resource. When <notifTarget> 315 is placed under an <AE> resource as its child resource and this <AE> resource is subscriber 173, <notifTarget> resource 315 represents notification target 175 which is associated with a <subscription> resource from this <AE> subscriber 173.

TABLE 9

Attributes of New <notifTarget> Resource

| Attributes of <notifTarget> | Description |
|---|---|
| notifTargetStatus | Indicate the current status of notification target 175 as represented by this <notifTarget> resource. The value of this attribute could be AVAILABLE or UNAVAILABLE. If status = AVAILABLE, this <notifTarget> is online and is able to receive notification messages from service layer 171. If status = UNAVAILABLE, this <notifTarget> is offline and unable to receive notification message from service layer 171. |
| newNotifURI | Indicates the new notification URI for this <notifTarget> to receive notification messages. |
| notifMode | The notification mode for this <notifTarget>. This parameter may be configured by subscriber 173 or notification target 175 If notifMode = 1, service layer 171 will always push notification message to this <notifTarget> as current oneM2M does. If notifMode = 2, service layer 171 will not push any notification message to this <notifTarget>. Instead, this <notifTarget> actively pulls (i.e. retrieve) notification messages from service layer 171. If notifMode = 3, either push or pull model can be used to transmit notification messages to this <notifTarget>. |
| schedule | Indicates the time schedule information of this <notifTarget>. For example, this <notifTarget> will be available for next 30 minutes or will be unavailable for next 2 days, etc. |
| expectedNotifRate | Indicates the expected or allowed maximum rate of notification messages which the <notifTarget> can receive and process. |
| numOfRecvdNotif | Indicates the number of successfully received notification messages by this <notifTarget> for the <subscription> as indicated by subscriptionRef. |
| subscriptionRef | Is a reference to a corresponding <subscription> resource, with which this <notifTarget> is associated with. Through this attribute, it is able to know and access the associated subscriber 173 and other attributes of the <subscription> resource related to this <notifTarget>. |

Operations including CREATE, RETRIEVE, UPDATE, and DELETE are allowed for <notifTarget> resource to realize the disclosed interactions among subscriber 173, service layer 171, and notification targets, as summarized in Table 10.

TABLE 10

Allowed Operations on <notifTarget> Resource

| Operations | Allowed | Originator | Receiver |
|---|---|---|---|
| CREATE | YES | AE or CSE (e.g. the subscriber 173 or notification target 175) | CSE which hosts corresponding <subscription> resource and is responsible to issue notifications. |
| RETRIEVE | YES | AE or CSE (e.g. the subscriber 173 or notification target 175) | CSE which hosts <notifTarget> resource |
| UPDATE | YES | AE or CSE (e.g. the subscriber 173 or notification target 175) | CSE which hosts <notifTarget> resource |

TABLE 10-continued

Allowed Operations on <notifTarget> Resource

| Operations | Allowed | Originator | Receiver |
|---|---|---|---|
| DELETE | YES | AE or CSE (e.g. the subscriber 173 or notification target 175) | CSE which hosts <notifTarget> resource |
| NOTIFY | NO | N/A | N/A |

Create <notifTarget> may be used for creating a <notifTarget> resource.

TABLE 11

| <notifTarget> CREATE | |
|---|---|
| <notifTarget> CREATE | |
| Associated Reference Point | Mca, Mcc and Mcc' |
| Information in Request message | All parameters defined in table 8.1.2-3 in oneM2M Functional Architecture apply with the specific details for:<br>Content: attributes of the <notifTarget> resource. |
| Processing at Originator before sending Request | According to clause 10.1.1.1 in oneM2M Functional Architecture. |
| Processing at Receiver | According to clause 10.1.1.1 in oneM2M Functional Architecture. |
| Information in Response message | All parameters defined in table 8.1.3-1 in oneM2M Functional Architecture apply with the specific details for:<br>Content: Address of the created <notifTarget> resource, according to clause 10.1.1.1 in oneM2M Functional Architecture. |
| Processing at Originator after receiving Response | According to clause 10.1.1.1 in oneM2M Functional Architecture. |
| Exceptions | According to clause 10.1.1.1 in oneM2M Functional Architecture. |

Retrieve <notifTarget> may be used to retrieve attributes of a <notifTarget> resource (e.g., by the subscriber 173 or notification target 175). The generic retrieve procedure is described in clause 10.1.2 in oneM2M Functional Architecture.

TABLE 12

| <notifTarget> RETRIEVE | |
|---|---|
| <notifTarget> RETRIEVE | |
| Associated Reference Point | Mca, Mcc and Mcc' |
| Information in Request message | All parameters defined in table 8.1.2-3 in oneM2M Functional Architecture apply with the specific details for:<br>Content: void |
| Processing at Originator before sending Request | According to clause 10.1.2 in [0088]. |
| Processing at Receiver | According to clause 10.1.2 in oneM2M Functional Architecture. |
| Information in Response message | All parameters defined in table 8.1.3-1 in oneM2M Functional Architecture apply with the specific details for:<br>Content: attributes of the <notifTarget> resource |
| Processing at Originator after receiving Response | According to clause 10.1.2 in oneM2M Functional Architecture. |
| Exceptions | According to clause 10.1.2 in oneM2M Functional Architecture. |

Update <notifTarget> may be used for updating the attributes and the actual data of a <notifTarget> resource.

TABLE 13

| <notifTarget> UPDATE | |
|---|---|
| <notifTarget> UPDATE | |
| Associated Reference Point | Mca, Mcc and Mcc' |
| Information in Request message | All parameters defined in table 8.1.2-3 in oneM2M Functional Architecture apply with the specific details for:<br>Content: attributes of the <notifTarget> resource which need be updated |
| Processing at Originator before sending Request | According to clause 10.1.3 in oneM2M Functional Architecture. |
| Processing at Receiver | According to clause 10.1.3 in oneM2M Functional Architecture. |
| Information in Response message | According to clause 10.1.3 in oneM2M Functional Architecture. |
| Processing at Originator after receiving Response | According to clause 10.1.3 in oneM2M Functional Architecture. |
| Exceptions | According to clause 10.1.3 in oneM2M Functional Architecture. |

Delete <notifTarget> may be used to remove a <notifTarget> resource. The generic delete procedure is described in clause 10.1.4.1 in oneM2M Functional Architecture.

TABLE 14

| <notifTarget> DELETE | |
|---|---|
| <notifTarget> DELETE | |
| Associated Reference Point | Mca, Mcc and Mcc'. |
| Information in Request message | All parameters defined in table 8.1.2-3 in oneM2M Functional Architecture apply. |
| Processing at Originator before sending Request | According to clause 10.1.4.1 in oneM2M Functional Architecture. |
| Processing at Receiver | According to clause 10.1.4.1 in oneM2M Functional Architecture. |
| Information in Response message | According to clause 10.1.4.1 in oneM2M Functional Architecture. |
| Processing at Originator after receiving Response | According to clause 10.1.4.1 in oneM2M Functional Architecture. |
| Exceptions | According to clause 10.1.4.1 in oneM2M Functional Architecture. |

Existing <subscription> resource in oneM2M may be extended to support the disclosed subscription and notification methods and systems by adding several new attributes as described in Table 15. Note that <notifTarget> and <notification> may be added new child-resource for <subscription>. Alternatively, these new attributes may be added as new attributes or new child-resources of existing oneM2M <notificationTargetPolicy> resource.

TABLE 15

New Attributes of <subscription> Resource

| New Attributes of <subscription> | Description |
| --- | --- |
| notifRecordReq | Indicate the subscriber 173's requirement on recording notification messages which are issued and transmitted by service layer 171 to notification targets. notifRecordReq is a complex parameter and defined in Table 1. The subscriber 173 can always update this attribute to indicate its new requirements on recording notification messages. |
| notifStatReq | Indicate the subscriber 173's requirement on calculating notification statistical information to be performed by service layer 171. notifStatReq is a complex parameter and defined in Table 2. The subscriber 173 can always update this attribute to indicate its new requirements on calculating notification statistical information. |
| notifStatInfo | Indicate the calculated notification statistical information about all notifications associated with a subscription (i.e. a <subscription> resource). The value of this attribute is dependent on the subscriber 173's requirements (i.e. notifStatReq). |
| notifConfirmReq | Indicate the subscriber 173's requirement on receiving notification confirmation from service layer 171. notifConfirmReq is a complex parameter and defined in Table 3. The subscriber 173 can always update this attribute to indicate its new requirements on receiving notification confirmation. |
| subConfirmReq | Indicate the subscriber 173's requirement on which notification targets should be contacted to confirm with for this <subscription> request. subConfirmReq is a complex parameter and defined in Table 4. The subscriber 173 can always update this attribute to indicate its new requirements on notification targets to be confirmed for subscription confirmation. |
| notifTargetStatus | This attribute is a list which indicates the status of all notification targets associated with this <subscription>. Each item stands the status of a notification target 175. The status of a notification target 175 could be one or multiple attributes of <notifTarget> resource. This attribute provides an alternative approach for service layer 171 to maintain the status information about each notification target 175, instead of creating separate <notifTarget> resource for each notification target 175. |

The status (e.g., availability) of a notification target 175, captured in the notifTargetStatus attribute (Table 15), may be maintained via UPDATE operations by either the subscription hosting CSE, the subscriber or any other entities (including notification target 175 itself) with access control rights. An additional mechanism for a notification target 175 to update its status (i.e. notifTargetStatus attribute) uses the new virtual resources below (proposed as child-resource of a <subscription> resource). These mechanisms may be alternatives to each other or may coexist in a given implementation.

<notifTargetStatusReference>: a notification target 175 may issue an UPDATE operation request with a payload containing its new status (e.g., an item of "notifTargetStatus" attribute in Table 15) to this virtual resource of a <subscription> resource; in turn, service layer 171 updates "notifTargetStatus" attribute of this <subscription> resource.

<notifTargetOnline>: a Notification Target may issue an UPDATE operation request to this virtual resource of a <subscription> resource to inform service layer 171 that it becomes online; in turn, service layer 171 marks this notification target 175 as online and available for receiving notifications.

<notifTargetOffline>: a Notification Target may issue an UPDATE operation request to this virtual resource of a <subscription> resource to inform service layer 171 that it becomes offline; in turn, service layer 171 marks this notification target 175 as offline and unavailable for receiving notifications.

Alternatively, the above three new attributes may be implemented with existing oneM2M virtual resource <notificationTargetSelfReference>. In other words, a notification target 175 can issue an UPDATE operation request to <notificationTargetSelfReference> of a <subscription> resource with a payload containing its new status. Accordingly, service layer 171 updates "notifTargetStatus" attribute of the same <subscription> resource.

FIG. 18 illustrates an exemplary user interface. From perspective of subscriber 173 (e.g. an oneM2M AE or M2M terminal device 18), user interface 325 may be displayed and be used to configure parameters such as notifRecordReq (requirements on recording notifications), notifStatReq (requirements on calculating notification statistical information), notifConfirmReq (requirements on notification confirmation), and subConfirmReq (requirements on subscription confirmation), and display results about notifStatInfo (calculated notification statistical information) and notifTargetStatus (obtained notification target 175 state). Note that these parameters have been described and defined herein. The same user interface 325 may also be added as an application to service layer 171 (e.g., the hosting CSE or M2M gateway device 14).

Figure 19:
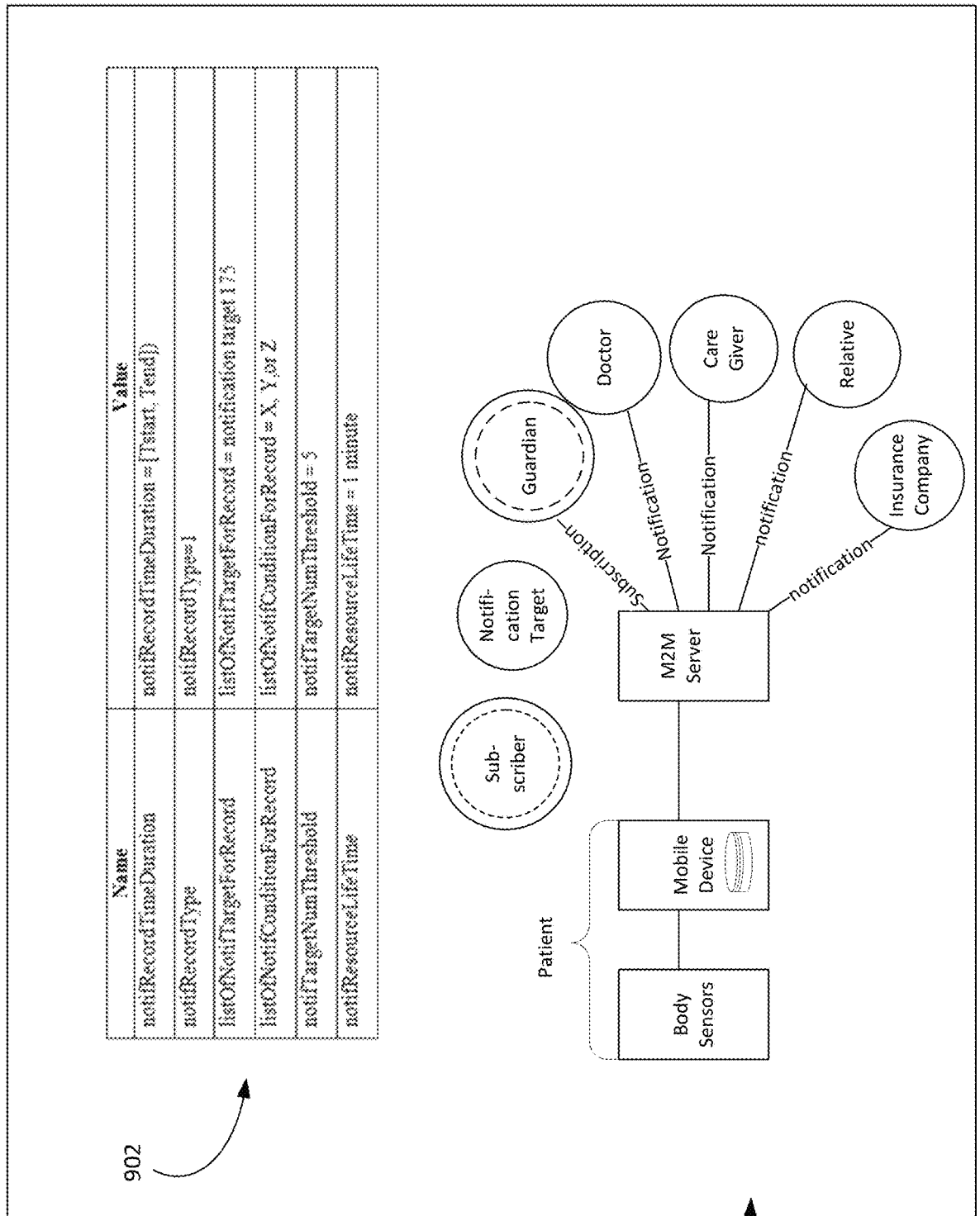
FIG. 19 illustrates an exemplary display (e.g., graphical user interface) that may be generated based on the methods and systems discussed herein.
Figure 20A:
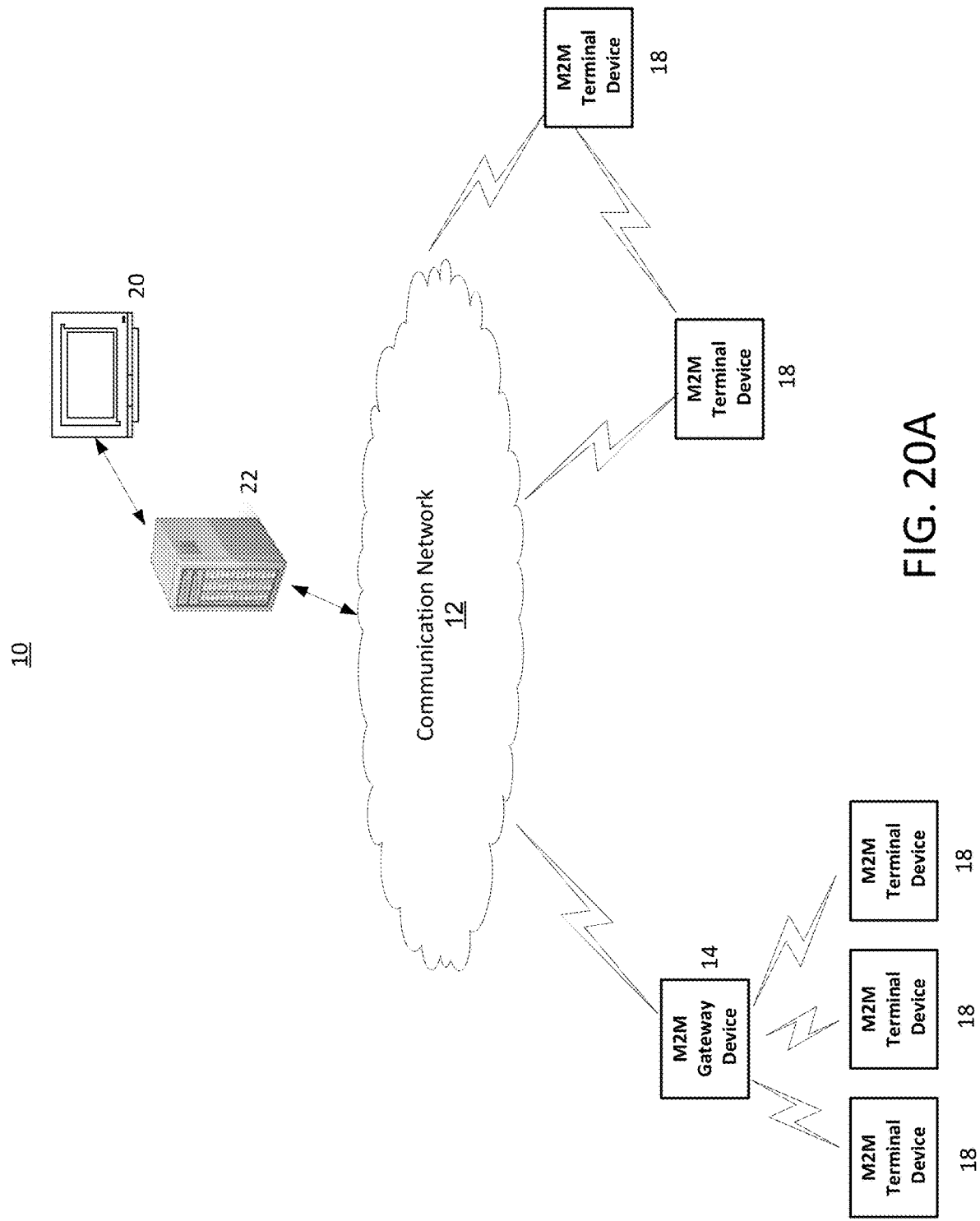
FIG. 20A is a system diagram of an example machine-to-machine (M2M) or Internet of Things (IoT) communication system in which the disclosed subject matter may be implemented.

FIG. 19 illustrates an exemplary display (e.g., graphical user interface) that may be generated based on the methods and systems discussed herein. Display interface 901 (e.g., touch screen display) may provide text in block 902 associated with a subscription and notification service, such as values for the parameters of Table 1 through Table 15. In another example, progress of any of the steps (e.g., sent messages or success of steps) discussed herein may be displayed in block 902. In addition, graphical output 903 may be displayed on display interface 901. Graphical output 903 may be the topology of the devices in associated with a subscription and notification service, a graphical output of the progress of any method or systems discussed herein, or the like FIG. 20A is a diagram of an example machine-to machine (M2M), Internet of Things (IoT), or Web of Things (WoT) communication system 10 in which one or more disclosed concepts associated with subscription and notification service may be implemented (e.g., FIG. 6-FIG. 14 and accompanying discussion). Generally, M2M technologies provide building blocks for the IoT/WoT, and any M2M device, M2M gateway or M2M service platform may be a component of the IoT/WoT as well as an IoT/WoT service layer, etc.

As shown in FIG. 20A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 20A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 20B:
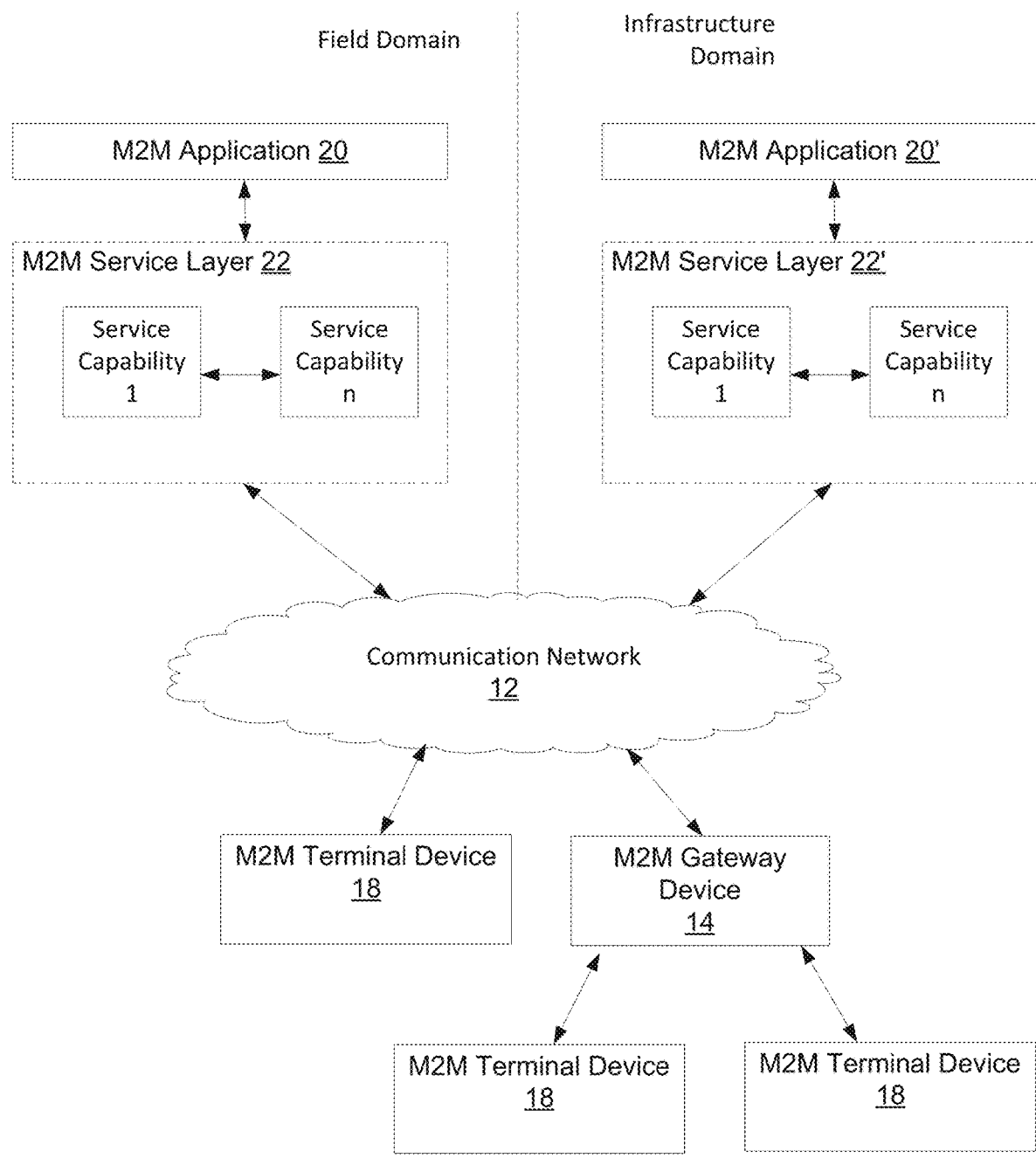
FIG. 20B is a system diagram of an example architecture that may be used within the M2M/IoT communications system illustrated in FIG. 20A.

Referring to FIG. 20B, the illustrated M2M service layer 22 (e.g., a CSE or M2M server 153 as described herein) in the field domain provides services for the M2M application 20 (e.g., guardian 155 or subscriber 173), M2M gateway devices 14, and M2M terminal devices 18, and the communication network 12. It will be understood that the M2M service layer 22 may communicate with any number of M2M applications, M2M gateway devices 14, M2M terminal devices 18, and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc.

Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g., cloud/compute/storage farms, etc.) or the like.

Referring also to FIG. 20B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide.

In some examples, M2M applications 20 and 20' may include desired applications that communicate using a subscription and notification service, as discussed herein. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to the M2M applications 20 and 20'.

The methods and systems for a subscription and notification service of the present application may be implemented as part of a service layer. The service layer is a middleware layer that supports value-added service capabilities through a set of application programming interfaces (APIs) and underlying networking interfaces. An M2M entity (e.g., an M2M functional entity such as a device, gateway, or service/platform that is implemented on hardware) may provide an application or service. Both ETSI M2M and oneM2M use a service layer that may include the methods and systems for a subscription and notification service of the present application. The oneM2M service layer supports a set of Common Service Functions (CSFs) (i.e., service capabilities). An instantiation of a set of one or more particular types of CSFs is referred to as a Common Services Entity (CSE), which can be hosted on different types of network nodes (e.g., infrastructure node, middle node, application-specific node). Further, the methods and systems for a subscription and notification service of the present application can be implemented as part of an M2M network that uses a Service Oriented Architecture (SOA) or a resource-oriented architecture (ROA) to access services such as the subscription and notification service of the present application.

As disclosed herein, the service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications r various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware or software and that provides (service) capabilities or functionalities exposed to various applications or devices (i.e., functional interfaces between such functional entities) in order for them to use such capabilities or functionalities.

Figure 20C:
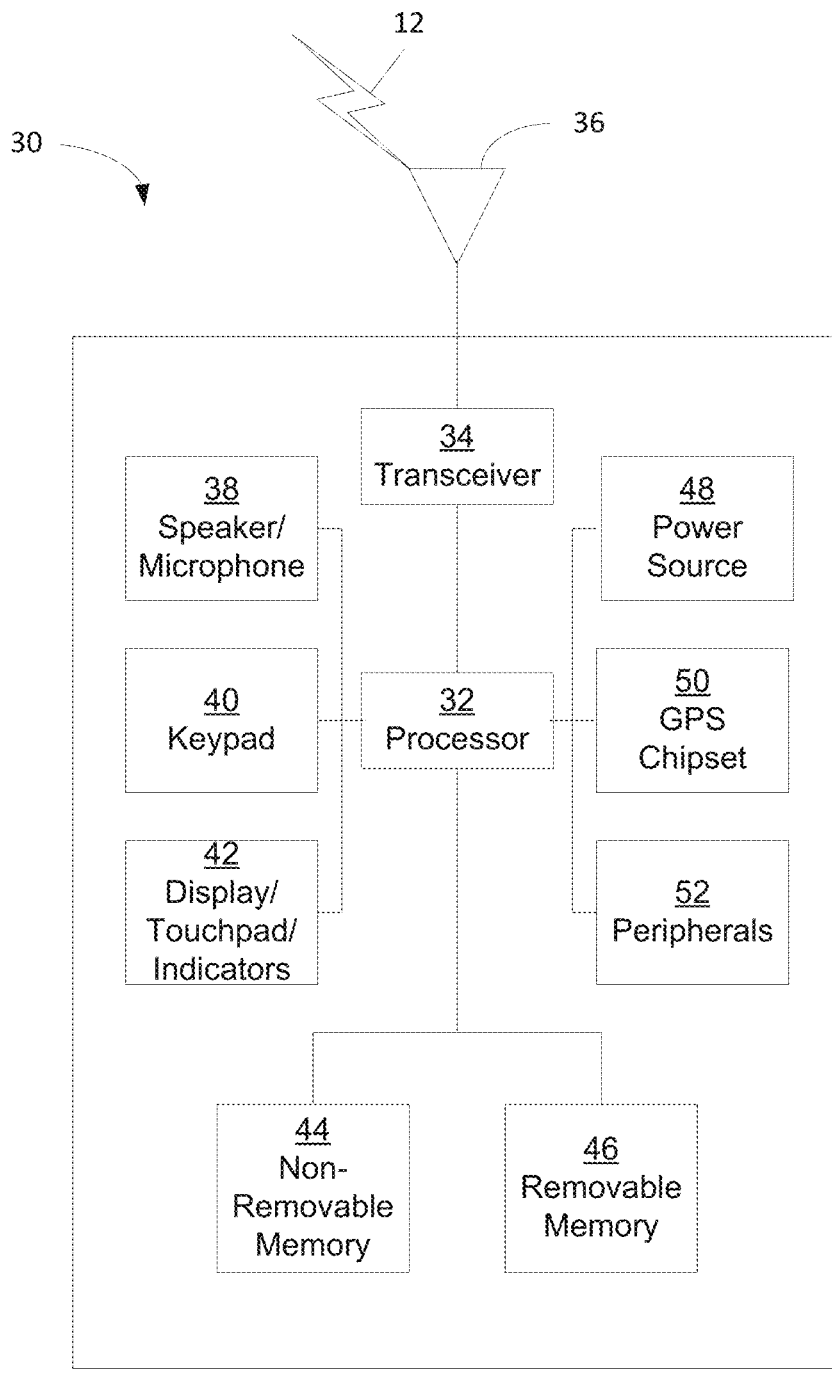
FIG. 20C is a system diagram of an example M2M/IoT terminal or gateway device that may be used within the communications system illustrated in FIG. 20A.

FIG. 20C is a system diagram of an example M2M device 30, such as an M2M terminal device 18 (which may include subscriber 173) or an M2M gateway device 14 (which may include one or more components of FIG. 5 or FIG. 6), for example. As shown in FIG. 20C, the M2M device 30 may include a processor 32, a transceiver 34, a transmit/receive element 36, a speaker/microphone 38, a keypad 40, a display/touchpad 42, non-removable memory 44, removable memory 46, a power source 48, a global positioning system (GPS) chipset 50, and other peripherals 52. It will be appreciated that the M2M device 30 may include any sub-combination of the foregoing elements while remaining consistent with the disclosed subject matter. M2M device 30 (e.g., M2M server 153, device 155, device 156 through device 159, subscriber 173, notification target 175, and others) may be an exemplary implementation that performs the disclosed systems and methods for subscription and notification service.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 32 may perform signal coding, data processing, power control, input/output processing, or any other functionality that enables the M2M device 30 to operate in a wireless environment. The processor 32 may be coupled to the transceiver 34, which may be coupled to the transmit/receive element 36. While FIG. 20C depicts the processor 32 and the transceiver 34 as separate components, it will be appreciated that the processor 32 and the transceiver 34 may be integrated together in an electronic package or chip. The processor 32 may perform application-layer programs (e.g., browsers) or radio access-layer (RAN) programs or communications. The processor 32 may perform security operations such as authentication, security key agreement, or cryptographic operations, such as at the access-layer or application layer for example.

The transmit/receive element 36 may be configured to transmit signals to, or receive signals from, an M2M service platform 22. For example, the transmit/receive element 36 may be an antenna configured to transmit or receive RF signals. The transmit/receive element 36 may support various networks and air interfaces, such as WLAN, WPAN, cellular, and the like. In an example, the transmit/receive element 36 may be an emitter/detector configured to transmit or receive IR, UV, or visible light signals, for example. In yet another example, the transmit/receive element 36 may be configured to transmit and receive both RF and light signals. It will be appreciated that the transmit/receive element 36 may be configured to transmit or receive any combination of wireless or wired signals.

In addition, although the transmit/receive element 36 is depicted in FIG. 20C as a single element, the M2M device 30 may include any number of transmit/receive elements 36. More specifically, the M2M device 30 may employ MIMO technology. Thus, in an example, the M2M device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the M2M device 30 may have multi-mode capabilities. Thus, the transceiver 34 may include multiple transceivers for enabling the M2M device 30 to communicate via multiple RATs, such as UTRA and IEEE 802.11, for example.

The processor 32 may access information from, and store data in, any type of suitable memory, such as the non-removable memory 44 or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other examples, the processor 32 may access information from, and store data in, memory that is not physically located on the M2M device 30, such as on a server or a home computer. The processor 32 may be configured to control lighting patterns, images, or colors on the display or indicators 42 in response to whether the subscriptions or notifications in some of the examples described herein are successful or unsuccessful (e.g., subscription), or otherwise indicate a status of subscription and notification service and associated components. The control lighting patterns, images, or colors on the display or indicators 42 may be reflective of the status of any of the method flows or components in the FIG.'s illustrated or discussed herein (e.g., FIG. 6-FIG. 14, etc.). Disclosed herein are messages and procedures of subscription and notification service. The messages and procedures may be extended to provide interface/API for users to request subscription and notification resources via an input source (e.g., speaker/microphone 38, keypad 40, or display/touchpad 42) and request, configure, or query subscription and notification of resources, among other things that may be displayed on display 42.

The processor 32 may receive power from the power source 48, and may be configured to distribute or control the power to the other components in the M2M device 30. The power source 48 may be any suitable device for powering the M2M device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the M2M device 30. It will be appreciated that the M2M device 30 may acquire location information by way of any suitable location-determination method while remaining consistent with information disclosed herein.

The processor 32 may further be coupled with other peripherals 52, which may include one or more software or hardware modules that provide additional features, functionality or wired or wireless connectivity. For example, the peripherals 52 may include various sensors such as an accelerometer, biometrics (e.g., fingerprint) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The transmit/receive elements 36 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The transmit/receive elements 36 may connect to other components, modules, or systems of such apparatuses or devices via one or more interconnect interfaces, such as an interconnect interface that may comprise one of the peripherals 52.

Figure 20D:
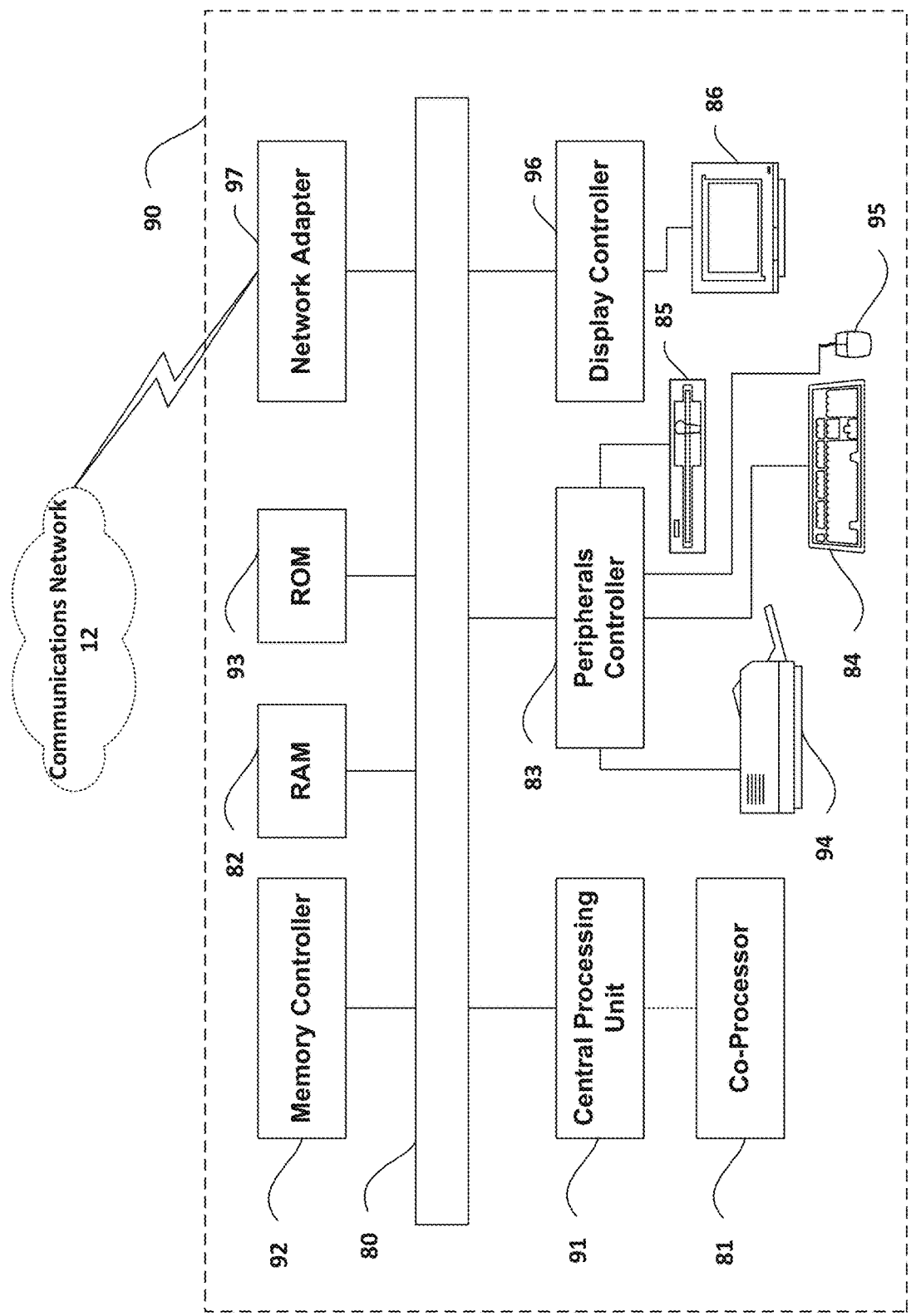
FIG. 20D is a block diagram of an example computing system in which aspects of the communication system of FIG. 20A may be embodied.

FIG. 20D is a block diagram of an exemplary computing system 90 on which, for example, the M2M service platform 22 of FIG. 20A and FIG. 20B may be implemented. Computing system 90 (e.g., M2M terminal device 18 or M2M gateway device 14) may comprise a computer or server and may be controlled primarily by computer readable instructions by whatever means such instructions are stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 or coprocessor 81 may receive, generate, and process data related to the disclosed systems and methods for subscription and notification service, such as receiving subscription requests and indicating notification target status.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 20A and FIG. 20B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not include signals per se. As evident from the herein description, storage media should be construed to be statutory subject matter. Computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer. A computer-readable storage medium may have a computer program stored thereon, the computer program may be loadable into a data-processing unit and adapted to cause the data-processing unit to execute method steps when the computer program is run by the data-processing unit.

In describing preferred methods, systems, or apparatuses of the subject matter of the present disclosure—subscription and notification service—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effectuate the methods described herein. As used herein, the terms "apparatus," "network apparatus," "node," "device," "network node," or the like may be used interchangeably. In addition, the use of the word "or" is generally used inclusively unless otherwise provided herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for means for a subscription or a notification service. A method, system, computer readable storage medium, or apparatus has means for obtaining (e.g., passively receive or actively retrieve) a first subscription request to receive an event notification of a resource by a subscriber device; and generating a resource to record a notification message based on the first subscription request. The method, system, computer readable storage medium, or apparatus has means for obtaining a second subscription request (e.g., a subsequent subscription request) to retrieve the event notification associated with a notification target based on discovery criteria; and when the discovery criteria is met, sending a response comprising the notification message. The method, system, computer readable storage medium, or apparatus has means for obtaining a second subscription request to retrieve the event notification associated with a notification target based on discovery criteria, wherein discovery criteria comprises a request for messages that have been sent and have not been acknowledged as obtained by the notification target; and when the discovery criteria is met, sending a response comprising the notification message. The method, system, computer readable storage medium, or apparatus has means for obtaining a second subscription request to delete the event notification associated with a notification target based on discovery criteria; and when the discovery criteria is met, sending a response acknowledging the second subscription request. The method, system, computer readable storage medium, or apparatus has means for obtaining a second subscription request to delete the notification associated with a notification target based on discovery criteria, wherein discovery criteria comprises messages that have been sent during a time period; and when the discovery criteria is met, sending a response acknowledging the second subscription request. The first subscription request may include instructions to record every notification issued during a time period. The first subscription request may include instructions to record notifications which are issued during a time period, delivered to notification targets in a list, and generated by conditions in a list. The first subscription request comprises instructions to record notifications when a certain number have failed for a particular notification target. A method, system, computer readable storage medium, or apparatus has means for obtaining an indication of the expiration time of a notification resource to be created. The apparatus may be a service layer. A method, system, computer readable storage medium, or apparatus has means for obtaining, from a subscriber, a first subscription request to receive an event notification of a resource by a subscriber device, the first subscription request comprising a first parameter that tells which notification target should be contacted to confirm the first subscription request; based on the first subscription request, sending a message to the notification target, the message comprising an identifier of a subscriber, an identifier of a subscribed resource, an identifier for the notification target to receive notifications, or event notification criteria; and generating a resource to record a notification message based on the first subscription request. All combinations in this paragraph (including the removal or addition of steps) are contemplated in a manner that is consistent with the other portions of the detailed description.

What is claimed:

1. An apparatus with a subscription and notification service, the apparatus comprising:
    a processor; and
    a memory coupled with the processor, the memory comprising executable instructions that when executed by the processor cause the processor to effectuate operations comprising:
    obtaining a subscription request from a subscriber device to a first resource being a uniquely addressable element in a Resource Oriented Architecture (ROA) having a representation that can be manipulated via RESTful methods, wherein the subscription request comprises:
    an event notification criteria that defines when the subscription and a notification service is to generate a notification event, and
    instructions on when, how, or which notification should be recorded;
    detecting the event notification criteria has been met for the first resource;
    generating an event notification for the first resource;
    transmitting a notification message to the subscriber device;
    recording the notification message to a second resource on the apparatus based on the instructions in the subscription request when the notification message has failed;

receiving, via RESTful methods, a retrieval request to retrieve the recorded notification message stored in the second resource; and based on the retrieval request, sending a response, wherein the response comprises content of the recorded notification message stored in the second resource.

2. The apparatus of claim 1, the operations further comprising:
obtaining a second subscription request to retrieve the event notification when the event notification occurs during a time period; and
sending a response to the second subscription request that comprises the notification message for the time period.

3. The apparatus of claim 1, the operations further comprising:
obtaining a second subscription request to retrieve the event notification associated with a notification target based on discovery criteria; and
when the discovery criteria is met, sending a response to the second subscription request that comprises the notification message.

4. The apparatus of claim 1, the operations further comprising:
obtaining a second subscription request to retrieve the event notification associated with a notification target based on discovery criteria, wherein discovery criteria comprises a request for messages that have been sent and have not been acknowledged as obtained by the notification target; and
when the discovery criteria is met, sending a response to the second subscription request that comprises the notification message.

5. The apparatus of claim 1, the operations further comprising:
obtaining a second subscription request to delete the event notification associated with a notification target based on discovery criteria; and
when the discovery criteria is met, sending a response acknowledging the second subscription request.

6. The apparatus of claim 1, the operations further comprising:
obtaining a second subscription request to delete the event notification associated with a notification target based on discovery criteria, wherein discovery criteria comprises messages that have been sent during a time period; and
when the discovery criteria is met, sending a response acknowledging the second subscription request.

7. The apparatus of claim 1, wherein the subscription request comprises instructions to record every notification issued during a time period.

8. The apparatus of claim 1, wherein the subscription request comprises instructions to record notifications which are issued during a time period, delivered to notification targets in a list, and generated by conditions in a list.

9. The apparatus of claim 1, wherein the subscription request comprises instructions to record notifications when a certain number have failed for a particular notification target.

10. The apparatus of claim 1, the operations further comprising obtaining an indication of an expiration time of a notification resource to be created.

11. The apparatus of claim 1, wherein the apparatus is a service layer.

12. A method for subscribing to a notification comprising:
obtaining a subscription request from a subscriber device to a first resource being a uniquely addressable element in a Resource Oriented Architecture (ROA) having a representation that can be manipulated via RESTful methods, wherein the subscription request comprises:
an event notification criteria that defines when a subscription and a notification service is to generate a notification event, and
instructions on when, how, or which notification should be recorded;
detecting the event notification criteria has been met for the first resource;
generating an event notification for the first resource;
transmitting a notification message to the subscriber device;
recording the notification message to a second resource on an apparatus based on the instructions in the subscription request when the notification message has failed;
receiving, via the RESTful methods, a retrieval request to retrieve the recorded notification message stored in the second resource; and
based on the retrieval request, sending a response, wherein the response comprises content of the recorded notification message stored in the second resource.

13. The method of claim 12, further comprising:
obtaining a second subscription request to retrieve the event notification when the event notification occurs during a time period; and
sending a response to the second subscription request that comprises the notification message for the time period.

14. The method of claim 12, further comprising:
obtaining a second subscription request to retrieve the event notification associated with a notification target based on discovery criteria; and
when the discovery criteria is met, sending a response to the second subscription request that comprises the notification message.

15. The method of claim 12, further comprising:
obtaining a second subscription request to retrieve the event notification associated with a notification target based on discovery criteria, wherein discovery criteria comprises a request for messages that have been sent and have not been acknowledged as obtained by the notification target; and
when the discovery criteria is met, sending a response to the second subscription request that comprises the notification message.

16. The method of claim 12, further comprising:
obtaining a second subscription request to delete the event notification associated with a notification target based on discovery criteria; and
when the discovery criteria is met, sending a response acknowledging the second subscription request.

17. The method of claim 12, further comprising:
obtaining a second subscription request to delete the event notification associated with a notification target based on discovery criteria, wherein discovery criteria comprises messages that have been sent during a time period; and
when the discovery criteria is met, sending a response acknowledging the second subscription request.

18. The method of claim 12, wherein the subscription request comprises instructions to record notifications which are issued during a time period, delivered to notification targets in a list, and generated by conditions in a list.

19. The method of claim 12, wherein the subscription request comprises instructions to record notifications when a certain number have failed for a particular notification target.

20. A system, the system comprising:

one or more processors; and memory coupled with the one or more processors, the memory comprising executable instructions that when executed by the one or more processors cause the one or more processors to effectuate operations comprising:

obtaining a subscription request from a subscriber device to a first resource being a uniquely addressable element in a Resource Oriented Architecture (ROA) having a representation that can be manipulated via RESTful methods, wherein the subscription request comprises:

an event notification criteria that defines when a subscription and a notification service is to generate a notification event, and instructions on when, how, or which notification should be recorded;

detecting the event notification criteria has been met for the first resource;

generating an event notification for the first resource;

transmitting a notification message to the subscriber device;

recording the notification message to a second resource on an apparatus based on the instructions in the subscription request when the notification message has failed;

receiving, via RESTful methods, a retrieval request to retrieve the recorded notification message stored in the second resource; and based on the retrieval request, sending a response, wherein the response comprises content of the recorded notification message stored in the second resource.

* * * * *